(12) United States Patent
Gao

(10) Patent No.: US 9,479,420 B2
(45) Date of Patent: Oct. 25, 2016

(54) FORWARDING A PACKET IN A NETWORK

(71) Applicant: Hangzhou H3C Technologies Co., Ltd., Hangzhou (CN)

(72) Inventor: Zhonghua Gao, Beijing (CN)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 14/443,914

(22) PCT Filed: Nov. 21, 2013

(86) PCT No.: PCT/CN2013/087546
§ 371 (c)(1),
(2) Date: May 19, 2015

(87) PCT Pub. No.: WO2014/079369
PCT Pub. Date: May 30, 2014

(65) Prior Publication Data
US 2015/0295811 A1 Oct. 15, 2015

(30) Foreign Application Priority Data

Nov. 21, 2012 (CN) .......................... 2012 1 0478960

(51) Int. Cl.
*H04L 12/46* (2006.01)
*H04L 12/753* (2013.01)
(Continued)

(52) U.S. Cl.
CPC ............. *H04L 45/02* (2013.01); *H04L 12/413* (2013.01); *H04L 12/4625* (2013.01); *H04L 12/4633* (2013.01); *H04L 12/4641* (2013.01); *H04L 45/48* (2013.01)

(58) Field of Classification Search
CPC ..... H04L 45/02; H04L 45/48; H04L 12/413; H04L 12/4633; H04L 12/4641
USPC .................................................. 370/351–356
See application file for complete search history.

(56) References Cited

U.S. PATENT DOCUMENTS 6,728,777 B1 * 4/2004 Lee ..................... H04L 12/1886
370/230
8,885,643 B2 * 11/2014 Mack-Crane ......... H04L 12/185
370/390

(Continued)

FOREIGN PATENT DOCUMENTS

| CN | 1744541 | 3/2006 |
|---|---|---|
| CN | 100433691 | 11/2008 |
| CN | 102075446 | 5/2011 |

OTHER PUBLICATIONS

International Search Report and Written Opinion dated Jan. 23, 2014 issued on PCT Patent Application No. PCT/CN2013/087546 dated Nov. 21, 2013, The State Intellectual Property Office, P.R. China.

*Primary Examiner* — Afsar M Qureshi
(74) *Attorney, Agent, or Firm* — Hewlett Packard Enterprise Patent Department

(57) ABSTRACT

According to an example, in a network having a plurality of routing bridges (RBs), a first RB may assign, based on a NickName of each RB in a NickName routing table at a control plane, a unicast tunnel label taking the NickName as a forwarding equivalence class (FEC), and may establish a point to point (P2P) label switched path (LSP) tunnel between the first RB and other RBs in a network. In addition, the first RB may at least one of receive and transmit a packet through the established P2P LSP tunnel.

15 Claims, 12 Drawing Sheets

(51) Int. Cl.
*H04L 12/751* (2013.01)
*H04L 12/413* (2006.01)

(56) References Cited

U.S. PATENT DOCUMENTS

| | | | |
|---|---|---|---|
| 8,964,571 B2* | 2/2015 | Chaudhry | H04L 45/02 370/223 |
| 9,246,838 B1* | 1/2016 | Shen | H04L 47/724 |
| 2002/0101875 A1* | 8/2002 | Lui | H04L 12/462 370/402 |
| 2006/0109801 A1* | 5/2006 | Ashwood Smith | H04L 12/18 370/256 |
| 2008/0107018 A1* | 5/2008 | Zhang | H04L 12/1877 370/228 |
| 2011/0158128 A1* | 6/2011 | Bejerano | H04L 12/1877 370/256 |
| 2011/0273990 A1* | 11/2011 | Rajagopalan | H04L 45/66 370/238 |
| 2012/0195229 A1* | 8/2012 | Chen | H04L 45/12 370/254 |
| 2014/0146825 A1* | 5/2014 | Ashwood-Smith | H04L 12/18 370/401 |

* cited by examiner

FORWARDING A PACKET IN A NETWORK

CLAIM FOR PRIORITY

The present application is a national stage filing under 35 U.S.C. §371 of PCT application number PCT/CN2013/087546, having an international filing date of Nov. 21, 2013, which claims priority to Chinese patent application number 201210478960.X, having a filing date of Nov. 21, 2012, the disclosures of which are hereby incorporated by reference in their entireties.

BACKGROUND

With the substantial increase in the number of servers and switches in data centers, data center networks are increasingly inclined to employ flat network architectures to facilitate maintenance and management. As such, data center networks are typically constructed with large-scale Layer 2 networks. A traditional Layer 2 network eliminates a loop through the Spanning Tree Protocol (STP). However, the STP may no longer be applicable to conventional data center networks due to some inherent defects in the STP. Therefore, the Internet Engineering Task Force (IETF) has introduced a design solution called the intermediate system-to-intermediate system (IS-IS), which is a Layer 3 routing technology, to the Layer 2 network through development of the transparent interconnection of lots of links (TRILL) protocol, and has made some necessary transformations. In one regard, through implementation of the TRILL protocol, the simplicity and flexibility of the Layer 2 network and the stability, extensibility, and high performance of the Layer 3 network have been integrated.

BRIEF DESCRIPTION OF THE DRAWINGS

Features of the present disclosure are illustrated by way of example and not limited in the following figure(s), in which like numerals indicate like elements, in which.

DETAILED DESCRIPTION

Figure 1:
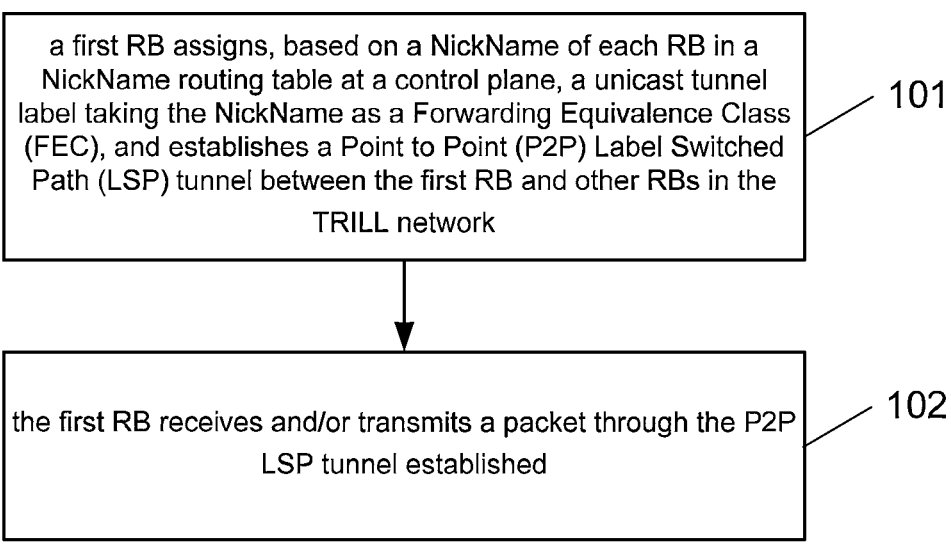
FIG. 1 is a flowchart illustrating a method for forwarding a packet in a TRILL network, according to an example of the present disclosure.

Hereinafter, the present disclosure will be described in further detail with reference to the accompanying drawings and examples to make the technical solution and merits therein clearer.

In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, and the term "including" means including but not limited to. The term "based on" means based at least in part on. In addition, the terms "a" and "an" are intended to denote at least one of a particular element.

In a TRILL network, a routing bridge (RB) may detect the topology of the TRILL network through running of a link state protocol (extended through the IS-IS), and generate, using the shortest path tree (SPT) algorithm, a routing forwarding table from the RB to other RBs in the TRILL network. The routing forwarding table may be called a NickName forwarding table. The RBs may mutually learn, through implementation of the end station address distribution information (ESADI) protocol, media access control (MAC) addresses of terminals connected to the RBs, and may store the MAC addresses in a local user MAC forwarding table of each RB, so that the RBs may detect to which RB a terminal MAC belongs. Therefore, tables stored in a RB and calculated through the TRILL signaling protocol may include two tables including:

(1) calculating a NickName routing table at a control plane and issuing the NickName routing table to a forwarding engine to form a NickName forwarding table at a data plane, as shown in Table 1:

TABLE 1

| NickName | Egress port | Outer VLAN | Outer D-MAC (Nexthop) |
| --- | --- | --- | --- |

(2) calculating an egress RB NickName corresponding to a MAC address of a user terminal and issuing the egress RB NickName to the forwarding engine to form a user MAC forwarding table at the data plane, as shown in Table 2:

TABLE 2

| User MAC | Egress RB NickName |
| --- | --- |

Therefore, upon receiving a normal unicast ethernet packet, the RB may search the user MAC forwarding table for an egress RB NickName corresponding to an inner (user or inner) D-MAC (a destination MAC address) included in the packet. The RB may then search the NickName forwarding table for an entry matching the egress RB NickName and may encapsulate, using information in the entry, the packet into a TRILL packet for forwarding in the TRILL network. Since the NickName forwarding table exists on the RB recording routing information towards each RB, the RB may forward the TRILL packet according to the NickName forwarding table after receiving the TRILL packet. When a RB receives a TRILL packet, the RB may decapsulate the TRILL packet to obtain an ethernet packet as initially entered into the TRILL network if an egress RB NickName in the TRILL packet is a NickName of the RB itself and may then forward the packet.

In addition, the TRILL protocol defines a multicast forwarding operation based on a distribution tree for forwarding a multicast packet, a broadcast packet and an inner D-MAC unaware unicast packet. The distribution tree of the TRILL protocol, similarly to a spanning tree of the STP, has a root of the distribution tree, which is called a designated RB (DRB). What is different from the spanning tree algorithm of the STP is that the distribution tree of the TRILL is calculated from IS-IS network topology and one distribution tree is generated for the entire TRILL network. When a RB receives a broadcast ethernet packet, a multicast ethernet packet, or an inner D-MAC unaware unicast ethernet packet, the RB may not only distribute the packet to other common virtual local area network (VLAN) ports on the RB, but may also encapsulate the packet into a TRILL packet, in which an egress RB NickName is a NickName of a DRB of a VLAN distribution tree, and the TRILL packet may be distributed to other leaf RBs of the distribution tree through the DRB.

An outer source MAC address (referred to as an outer S-MAC) and an outer destination MAC address (referred to as an outer D-MAC) in a TRILL packet respectively indicate a source RB sending the TRILL packet and a destination RB receiving the TRILL packet, and these two fields may be changed during a process for forwarding the TRILL packet hop-by-hop. A TRILL header may include a Nickname of an egress RB (an egress RB Nickname), a Nickname of an ingress RB (an ingress RB Nickname), etc. Among them, the egress RB is the destination RB of the TRILL packet, i.e., the TRILL packet leaves the TRILL network through the egress RB. In addition, the ingress RB may mean that the TRILL packet enters into the TRILL network through the ingress RB. An outer VLAN and an inner VLAN in the TRILL packet respectively correspond to a VLAN used by TRILL forwarding and a VLAN generated when the packet enters the TRILL network.

As can be seen from the above description, in the TRILL network, the RB may encapsulate and forward a packet according to the user MAC forwarding table and/or the NickName forwarding table, and a RB NickName may be included in these tables. A hardware forwarding chip in the RB, such as an application specific integrated circuit (ASIC), a network processor (NP), etc., may need to support NickName forwarding. In this way, when the network is upgraded, the hardware forwarding chip may be required to be upgraded in addition to upgrading a protocol software at the control plane. As such, the financial burden and difficulties of network deployment may be increased.

Examples of the present disclosure provide a method for forwarding a packet in the TRILL network and a RB capable of employing the method that may obviate some of the problems associated with conventional packet forwarding techniques. In examples of the present disclosure, a multi-protocol label switching (MPLS) label switched path (LSP) tunnel may be established among RBs in the TRILL network, which may include a point to point (P2P) LSP tunnel used for forwarding a unicast packet and a point to multi-point (P2MP) LSP tunnel used for forwarding a broadcast/multicast/Inner D-MAC unaware unicast packet. A packet may be forwarded through the MPLS LSP tunnel instead of the NickName forwarding. Therefore, the hardware forwarding chip may simply support the MPLS LSP tunnel forwarding and may not need to support the NickName forwarding. As such, the hardware forwarding chip may not need to be upgraded when the network is upgraded and thus, the economic costs and the difficulties associated with network deployment may substantially be reduced.

An example of the present disclosure provides a method for forwarding a packet in a TRILL network, in which the TRILL network includes a plurality of routing bridges (RBs), as shown in FIG. 1. The method may include the following operations. In block 101, a first RB may assign, based on a NickName of each RB in a NickName routing table at a control plane, a unicast tunnel label taking the NickName as a forwarding equivalence class (FEC), and establish a point to point (P2P) label switched path (LSP) tunnel between the first RB and other RBs in the TRILL network. In block 102, the first RB may receive and/or transmit a packet through the established P2P LSP tunnel.

Figure 5A:
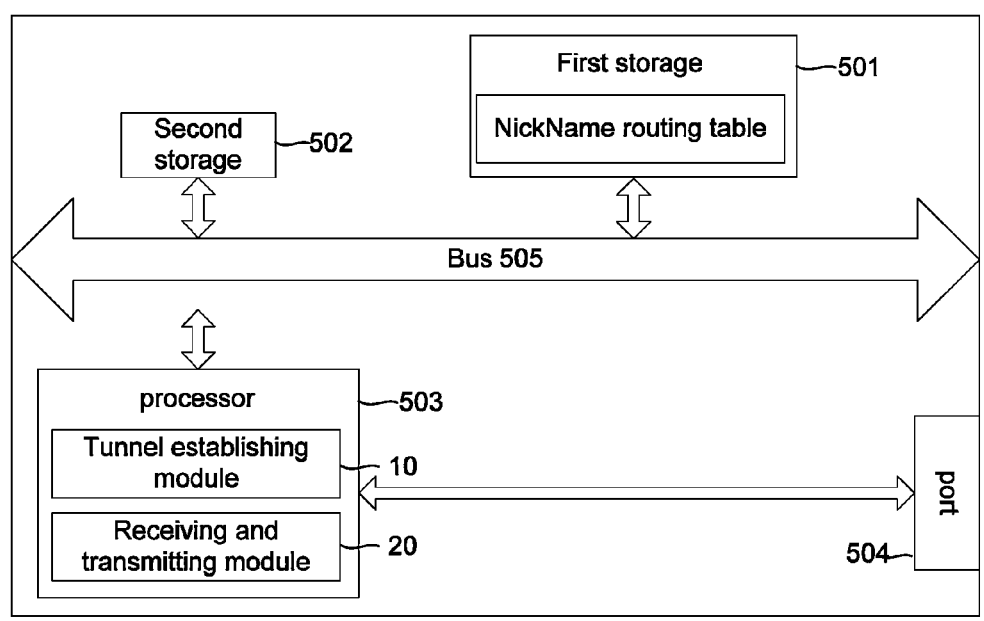
FIG. 5a is a schematic diagram illustrating a hardware structure of a RB in a TRILL network, according to an example of the present disclosure.

An example of the present disclosure provides a routing bridge (RB) in a TRILL network as shown in FIG. 5a. The RB may include a first storage to store a NickName routing table, a second storage to store machine readable instructions, and a processor to execute the machine readable instructions to perform operations. The operations may include assigning, based on a NickName of each RB in a NickName routing table at a control plane, a unicast tunnel label, in which the NickName is taken as a forwarding equivalence class (FEC), and establishing a point to point (P2P) label switched path (LSP) tunnel between the RB and other RBs in the TRILL network. The operations may also include receiving and/or transmitting a packet through the established P2P LSP tunnel.

It should be noted that hereinafter a first RB may be any RB in the TRILL network and does not indicate a particular RB, which is simply named for ease of description. In addition, the method for forwarding a packet in the TRILL network provided by an example of the present disclosure may be executed by any RB in the TRILL network. As shown in FIG. 1, the method may include the following operations.

In block 101, a first RB may assign, based on a NickName of each RB in the NickName routing table at the control plane, a unicast tunnel label, in which the NickName is taken as a forwarding equivalence class (FEC), and may establish a P2P LSP tunnel between the first RB and other RBs in the TRILL network. In an example, the NickName routing table at the control plane is not issued to the data plane. P2P LSP tunnels among RBs are established using the NickName routing table and the NickName is taken as the FEC through a signaling protocol similar to the label distribution protocol (LDP) or in a manner of static configuration.

In practice, there may be a variety of methods for establishing a P2P LSP tunnel between the first RB and another RB and thus, examples of the present disclosure are not to be limited to any particular method. For example, the signaling protocol similar to the LDP may be created in the TRILL network, the unicast tunnel label may be assigned taking the RB NickName as the FEC, and the P2P LSP tunnel may be established. The difference between the signaling protocol similar to the LDP and the standard LDP is that the NickName is used as the FEC. The unicast tunnel label may also be configured in a manner of static configuration and the P2P LSP tunnel between the first RB and the other RB may be established.

Figure 1A:
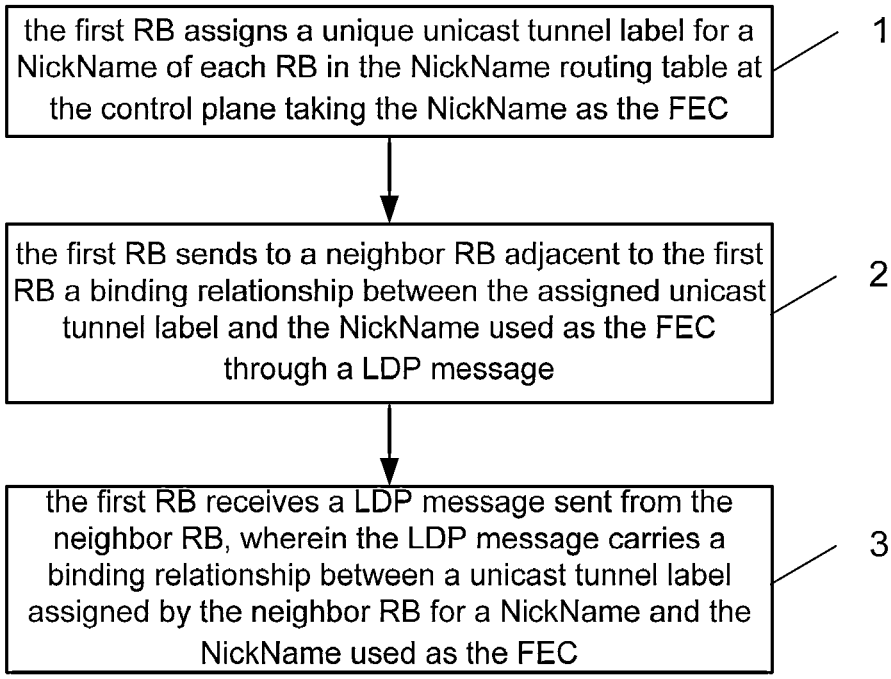
FIG. 1a is a flowchart illustrating a method for establishing a P2P LSP tunnel using a signaling protocol similar to the LDP, according to an example of the present disclosure.

Specifically, a method for establishing the P2P LSP tunnel using the signaling protocol similar to the LDP may include the operations shown in FIG. 1a. With reference to that figure, in block 1, the first RB may assign a unique unicast tunnel label for a NickName of each RB in the NickName routing table at the control plane, in which the NickName is taken as the FEC. In this case, each RB may also include the first RB itself. Therefore, the first RB may also assign a unique unicast tunnel label for the NickName of the first RB.

In block 2, the first RB may send to a neighbor RB adjacent to the first RB, a binding relationship between the assigned unicast tunnel label and the NickName used as the FEC through a LDP message. In this case, the first RB may send to the neighbor RB the binding relationship between each NickName used as the FEC and the unicast tunnel label assigned for the NickName.

In block 3, the first RB may receive a LDP message sent from the neighbor RB, in which the LDP message carries a binding relationship between a unicast tunnel label assigned by the neighbor RB for a NickName and the NickName used as the FEC. Similarly, the first RB may also receive from the neighbor RB the LDP message carrying the binding relationship between each NickName used as the FEC and the unicast tunnel label assigned by the neighbor RB for the NickName. In this manner, the P2P LSP tunnel between the first RB and the other RB in the TRILL network may be established through the above blocks 1-3.

In block 102 (FIG. 1), the first RB may receive and/or send a packet through the established P2P LSP tunnel. After the P2P LSP tunnel between the first RB and the other RB in the TRILL network is established, the first RB may forward a unicast packet using the P2P LSP tunnel instead of through NickName forwarding.

In an example of the present disclosure, P2P LSP tunnels are established between RBs in a TRILL network and a packet is forwarded through the P2P LSP tunnels instead of through NickName forwarding. Therefore, the hardware forwarding chip may simply support the MPLS LSP tunnel forwarding, and may not need to support the NickName forwarding. In one regard, therefore, upgrading of the hardware forwarding chip may not be required when the network is upgraded, and thus, the economic costs associated with upgrading the network and the difficulties of network deployment may substantially be reduced as compared with conventional techniques.

Hereinafter, examples in which a packet is forwarded when the first RB is used as an ingress RB, a transit RB, or an egress RB are described in further detail.

Figure 1B:
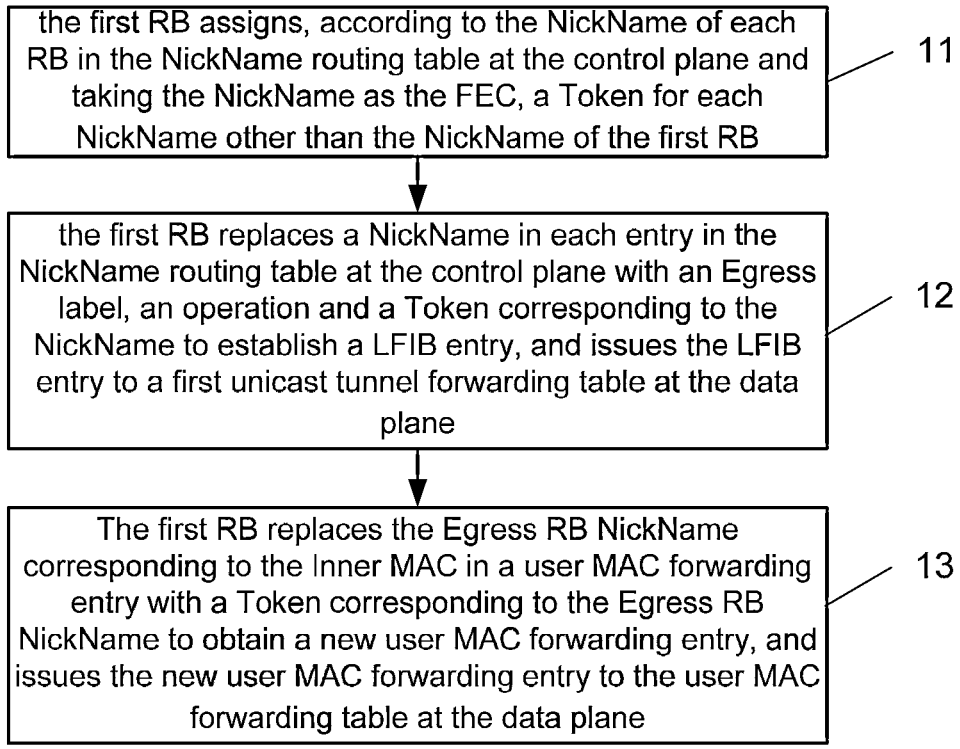
FIG. 1b is a flowchart illustrating a method for forwarding a packet in a TRILL network, according to an example of the present disclosure.

The first example is that the first RB is an ingress RB. In this example, after the first RB has established the P2P LSP tunnels between the first RB and other RBs in the TRILL network, the method may further include blocks 11-13 before block 102, as shown in FIG. 1b.

In block 11, the first RB may assign, according to the NickName of each RB in the NickName routing table at the control plane and taking the NickName as the FEC, a token for each NickName other than the NickName of the first RB. In this case, the token may be a marker of an ingress tunnel. The indication that the first RB may assign a token for each NickName other than the NickName of the first RB may be defined to mean that a token is assigned for an ingress tunnel from the first RB to a NickName used as the FEC. The token is recorded in a unicast tunnel forwarding entry associated with the each NickName at the data plane.

In block 12, the first RB may replace a NickName in each entry in the NickName routing table at the control plane with an egress label, an operation, and a token corresponding to the NickName to establish a label forwarding information base (LFIB) entry of the FEC, and may issue the LFIB entry, which may be taken as a unicast tunnel forwarding entry of the NickName, to a first unicast tunnel forwarding table at the data plane, as shown in table 3. The first RB may no longer issue the NickName routing table to the data plane.

TABLE 3

| Token | Egress label | Egress port | Outer VLAN | Next-hop MAC | operation |
| --- | --- | --- | --- | --- | --- |

In the first unicast tunnel forwarding table shown in Table 3, each unicast tunnel forwarding entry may include a token, an egress label, an egress port, an outer VLAN, a next-hop MAC, and an operation. Among them, the token may be a token corresponding to the replaced NickName, the egress label may be a unicast tunnel label assigned by the next hop for the replaced NickName, and the operation may be push (i.e., push the label).

In block 13, the first RB may replace the egress RB NickName corresponding to a user MAC in a user MAC forwarding entry with a token corresponding to the egress RB NickName to obtain a new user MAC forwarding entry, and may issue the new user MAC forwarding entry to the user MAC forwarding table at the data plane, as shown in Table 4.

TABLE 4

| User MAC | Token |
| --- | --- |

In the user MAC forwarding table shown in Table 4, each MAC forwarding entry may include an user MAC and a token. Among them, the token may be a token corresponding to an egress RB NickName corresponding to the user MAC.

As may be seen from Table 3 and Table 4, in an example, the NickName may no longer exist in the user MAC forwarding table and the first unicast tunnel forwarding table may be issued by the ingress RB to the data plane. The hardware forwarding chip (i.e., the forwarding engine or the data plane) may simply support the MPLS LSP tunnel forwarding when forwarding a packet, and thus may not need to support the NickName forwarding.

Figures 1C, 1D:
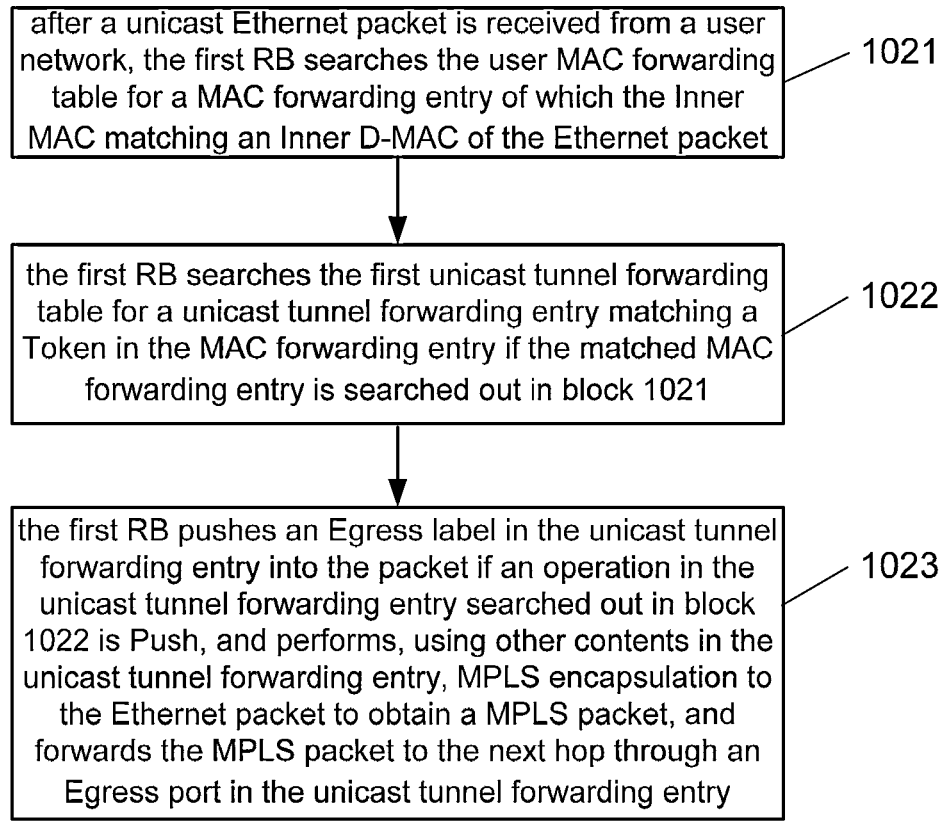
FIG. 1c is a flowchart illustrating a method for receiving and/or sending a packet through a P2P LSP tunnel, according to an example of the present disclosure.
FIG. 1d is a flowchart illustrating a method for forwarding a packet in a TRILL network, according to an example of the present disclosure.

In this manner, the process in block 102 for receiving and/or sending a packet by the first RB through the established P2P LSP tunnel may include the following operations, as shown in FIG. 1c. With reference to that figure, in block 1021, after a unicast ethernet packet is received from a user network, the first RB may search the user MAC forwarding table for a MAC forwarding entry of which the user MAC matches an inner D-MAC of the ethernet packet.

In block 1022, the first RB may search the first unicast tunnel forwarding table for a unicast tunnel forwarding entry matching a token in the MAC forwarding entry if the matched MAC forwarding entry is identified in block 1021.

In block 1023, the first RB may push an egress label in the unicast tunnel forwarding entry into the packet if an operation in the unicast tunnel forwarding entry identified in block 1022 is push, and may perform, using other content in the unicast tunnel forwarding entry, MPLS encapsulation to the ethernet packet to obtain a MPLS packet, and may forward the MPLS packet to the next hop through an egress port in the unicast tunnel forwarding entry.

Specifically, the first RB may push the egress label in the unicast tunnel forwarding entry into the ethernet packet, fill the outer D-MAC with the next-hop MAC in the unicast tunnel forwarding entry, fill the outer S-MAC with the MAC of the first RB, and fill the outer VLAN with the outer VLAN in the unicast tunnel forwarding entry.

The second example is that the first RB is a transit RB. In this example, after the first RB has established the P2P LSP tunnels between the first RB and other RBs in the TRILL network, the method may further include block 21, which may be implemented before block 102, as shown in FIG. 1d.

In block 21, the first RB may replace a NickName in each entry in the NickName routing table at the control plane with an ingress label, an egress label, and an operation to establish a LFIB entry, and may issue the LFIB entry, which may be taken as a unicast tunnel forwarding entry of the NickName, to a second unicast tunnel forwarding table at the data plane, as shown in table 5. The first RB may no longer issue the NickName routing table to the data plane.

TABLE 5

| Ingress label | Egress label | Egress port | Outer VLAN | next-hop MAC | operation |
| --- | --- | --- | --- | --- | --- |

In the second unicast tunnel forwarding table shown in Table 5, each unicast tunnel forwarding entry may include an ingress label, an egress label, an egress port, an outer VLAN, a next-hop MAC, and an operation. Among them, the ingress label may be a unicast tunnel label assigned by the first RB for the replaced NickName, the egress label may be a unicast tunnel label assigned for the replaced NickName by a next-hop RB which is in an entry corresponding to the replaced NickName in the NickName routing table, and the operation may be swap (i.e., swap the label).

Figure 1E:
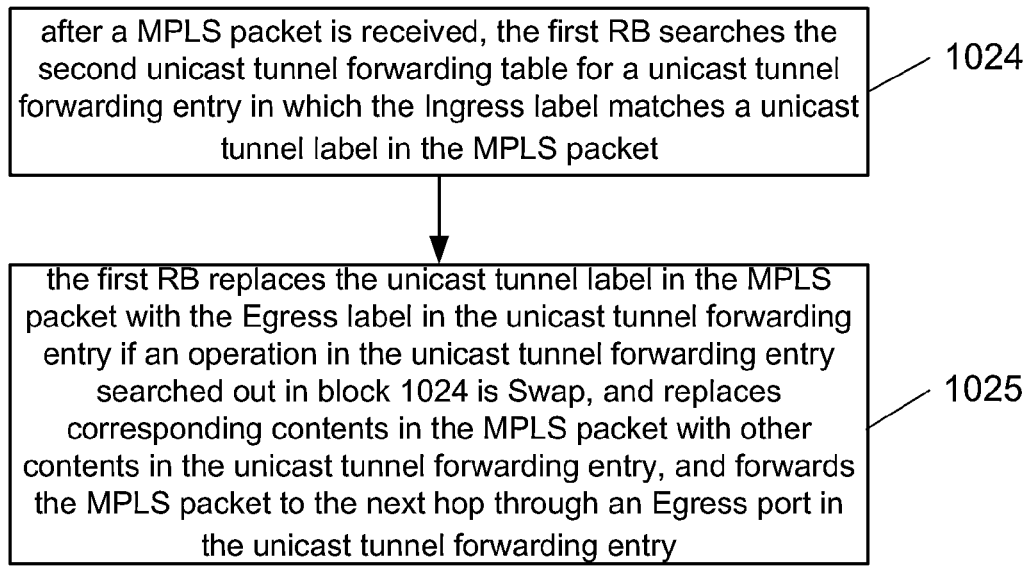
FIG. 1e is a flowchart illustrating a method for receiving and/or sending a packet through a P2P LSP tunnel, according to an example of the present disclosure.

In this example, the process in block 102 for receiving and/or sending a packet by the first RB through the established P2P LSP tunnel may include the following operations as shown in FIG. 1e. With reference to that figure, in block 1024, after a MPLS packet is received, the first RB may search the second unicast tunnel forwarding table for a unicast tunnel forwarding entry in which the ingress label matches a unicast tunnel label in the MPLS packet.

In block 1025, the first RB may replace the unicast tunnel label in the MPLS packet with the egress label in the unicast tunnel forwarding entry if an operation in the unicast tunnel forwarding entry identified in block 1024 is swap, may replace corresponding contents in the MPLS packet with other contents in the unicast tunnel forwarding entry, and may forward the MPLS packet to the next hop through an egress port in the unicast tunnel forwarding entry.

Specifically, the first RB may replace the unicast tunnel label in the MPLS packet with the egress label in the unicast tunnel forwarding entry, may replace the outer D-MAC in the MPLS packet with the next-hop MAC in the unicast tunnel forwarding entry, may replace the outer S-MAC with the MAC of the first RB, and may fill the outer VLAN in the MPLS packet with the outer VLAN in the unicast tunnel forwarding entry.

Figure 1F:
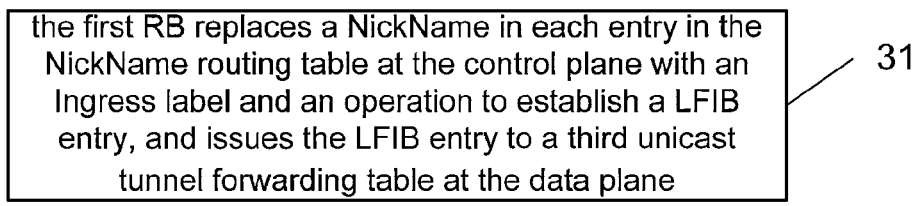
FIG. 1f is a flowchart illustrating a method for forwarding a packet in a TRILL network, according to an example of the present disclosure.

The third example is that the first RB is an egress RB. In this example, after the first RB has established the P2P LSP tunnels between the first RB and other RBs in the TRILL network, the method may further include block 31, which may be implemented before block 102, as shown in FIG. 1f. As shown in that figure, in block 31, the first RB may replace a NickName in each entry in the NickName routing table at the control plane with an ingress label and an operation to establish a LFIB entry and may issue the LFIB entry, which may be taken as a unicast tunnel forwarding entry of the NickName, to a third unicast tunnel forwarding table at the data plane, as shown in table 6. The first RB may no longer issue the NickName routing table to the data plane.

TABLE 6

| Ingress label | operation |
| --- | --- |

In the third unicast tunnel forwarding table shown in Table 6, each unicast tunnel forwarding entry may include an ingress label and an operation. Among them, the ingress label may be a unicast tunnel label assigned by the first RB for the replaced NickName and the operation may be pop (i.e., pop up the label).

Figure 1G:
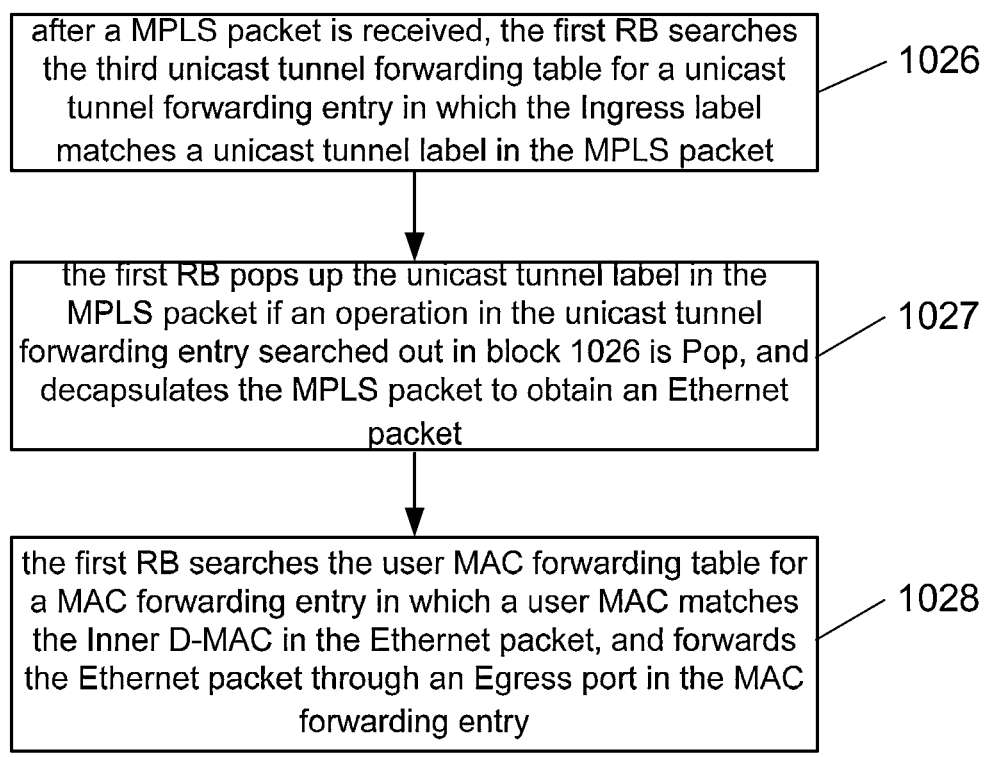
FIG. 1g is a flowchart illustrating a method for receiving and/or sending a packet through a P2P LSP tunnel, according to an example of the present disclosure.

According to an example, the process in block 102 for receiving and/or sending a packet by the first RB through the established P2P LSP tunnel may include the following operations, as shown in FIG. 1g. As shown in that figure, in block 1026, after a MPLS packet is received, the first RB may search the third unicast tunnel forwarding table for a unicast tunnel forwarding entry in which the ingress label matches a unicast tunnel label in the MPLS packet.

In block 1027, the first RB may pop up the unicast tunnel label in the MPLS packet if an operation in the unicast tunnel forwarding entry identified in block 1026 is pop and may decapsulate the MPLS packet to obtain an ethernet packet.

In block 1028, the first RB may search the user MAC forwarding table for a MAC forwarding entry in which a user MAC matches the inner D-MAC in the ethernet packet and may forward the ethernet packet through an egress port in the MAC forwarding entry, i.e., the packet may be forwarded to a host in the user network of which a MAC address is the Inner D-MAC.

As may be seen from the above method, examples of the present disclosure may employ MPLS LSP tunnel forwarding instead of NickName forwarding at the data plane, but at the control plane, i.e., in the TRILL protocol, the NickName may still be retained. In addition, the NickName routing table and an egress RB NickName corresponding to the user MAC user may still exist. However, at the data plane, the NickName may not exist in the user MAC forwarding table. Moreover, the unicast tunnel forwarding table may include the first unicast tunnel forwarding table, the second unicast tunnel forwarding table, and the third unicast tunnel forwarding table.

The first RB may be an ingress RB, but also may be a transit RB and an egress RB at the same time. In one regard, the first unicast tunnel forwarding table, the second unicast tunnel forwarding table, and the third unicast tunnel forwarding table may simultaneously exist at the data plane of the first RB. In this case, one table may be used to record contents of these three tables at the same time, as shown in Table 7.

TABLE 7

| Token | Ingress label | Egress label | Egress port | Outer VLAN | Next-hop MAC | operation |
|---|---|---|---|---|---|---|

In this way, and according to an example, an ingress label in a unicast tunnel forwarding entry of the first unicast tunnel forwarding table is null as the ingress label does not exist in the first unicast tunnel forwarding table. Similarly, a token in a unicast tunnel forwarding entry of the second unicast tunnel forwarding table is null as the token does not exist in the second unicast tunnel forwarding table. Since the token, the egress label, the egress port, the outer VLAN, and the next-hop MAC do not exist in the third unicast tunnel forwarding table, these corresponding contents in the third unicast tunnel forwarding table are all null.

Figure 2:
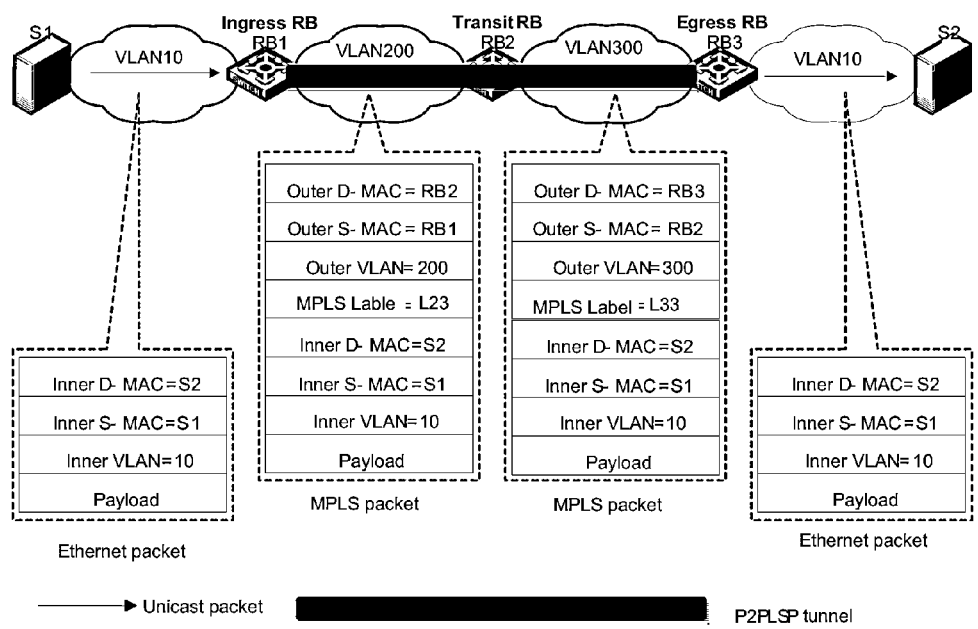
FIG. 2 is a schematic diagram illustrating forwarding a unicast packet in a TRILL network, according to an example of the present disclosure.

An example of the method for forwarding a unicast packet provided by the above-mentioned examples is described in further detail taking the TRILL network shown in FIG. 2 as an example. As shown in FIG. 2, S1 is to send to S2 a unicast ethernet packet through the TRILL network, in this case, RB1 is an ingress RB, RB2 is a transit RB, and RB3 is an egress RB.

Employing the method shown in block 101, RB1, RB2, and RB3 may assign a unicast tunnel label for a NickName of each RB, in which the NickName is taken as a FEC, and may establish P2P LSP tunnels between other RBs. The unicast tunnel labels assigned by RB1, RB2, and RB3 may be as shown in Tables 8-10, respectively.

TABLE 8

The unicast tunnel labels assigned by RB1

| FEC | unicast tunnel label |
|---|---|
| NickName of RB1 | L11 |
| NickName of RB2 | L12 |
| NickName of RB3 | L13 |

TABLE 9

The unicast tunnel labels assigned by RB2

| FEC | unicast tunnel label |
|---|---|
| NickName of RB1 | L21 |
| NickName of RB2 | L22 |
| NickName of RB3 | L23 |

TABLE 10

The unicast tunnel labels assigned by RB3

| FEC | unicast tunnel label |
|---|---|
| NickName of RB1 | L31 |
| NickName of RB2 | L32 |
| NickName of RB3 | L33 |

According to the above method, a token assigned by RB1 as the ingress RB for each NickName other than the NickName of RB1 may be as shown in Table 11.

TABLE 11

| FEC | Token |
|---|---|
| NickName of RB2 | 0 |
| NickName of RB3 | 1 |

At this time, a user MAC forwarding table on RB1 may be shown in Table 12, and a first unicast tunnel forwarding table on RB1 may be shown in Table 13.

TABLE 12

| User MAC | Token |
|---|---|
| S2 | 1 (corresponding to the NickName of RB3) |

TABLE 13

| Token | Egress label | Egress port | Outer VLAN | Next-hop MAC | operation |
|---|---|---|---|---|---|
| 1 | L23 | Ethernet0 | VLAN 200 | RB2 MAC | Push |

A second unicast tunnel forwarding table on RB2 as the Transit RB may be as shown in Table 14.

TABLE 14

| Ingress label | Egress label | Egress port | Outer VLAN | Next-hop MAC | operation |
|---|---|---|---|---|---|
| L23 | L33 | Ethernet1 | VLAN 300 | RB3 MAC | Swap |

A third unicast tunnel forwarding table on RB3 as the egress RB may be shown in Table 15.

TABLE 15

| Ingress label | operation |
|---|---|
| L33 | Pop |

In this way, after a unicast ethernet packet sent from S1 is received, RB1 may search the user MAC forwarding table shown in Table 12 for a MAC forwarding entry matching the inner D-MAC carried in the ethernet packet, i.e., S2, in which a token in the MAC forwarding entry corresponding to S2 is 1. In addition, RB1 may search the first unicast tunnel forwarding table shown in Table 13 for a unicast tunnel forwarding entry matching the token 1, in which in the identified unicast tunnel forwarding entry, an egress label is L23, an egress port is Ethernet0, an outer VLAN is VLAN 200, a next-hop MAC is RB2 MAC, and an operation is push. Therefore, L23 may be pushed into the ethernet packet and the MPLS encapsulation may be performed to the ethernet packet. In this case, the outer D-MAC may be filled with RB2 MAC (represented as RB2 in FIG. 2), the outer S-MAC may be filled with the MAC of RB1 (represented as RB1 in FIG. 2), and the outer VLAN may be filled with VLAN 200 (represented as 200 in FIG. 2). Ultimately, RB1 may forward to RB2 the MPLS packet obtained through the encapsulation via Ethernet0.

Upon receiving the MPLS packet, RB2 may search the second unicast tunnel forwarding table shown in Table 14 for a unicast tunnel forwarding entry matching the unicast tunnel label L23 carried in the MPLS packet, in which in the identified unicast tunnel forwarding entry, an ingress label is L23, an egress label is L33, an egress port is Ethernet1, an outer VLAN is VLAN 300, a next-hop MAC is RB3 MAC, and an operation is swap. In addition, RB2 may replace L23 carried in the MPLS packet with L33, may modify the outer D-MAC of the MPLS packet as RB3 MAC (represented as RB3 in FIG. 2), may fill the outer S-MAC of the MPLS packet with the MAC of RB2 (represented as RB2 in FIG. 2), and may fill the outer VLAN with VLAN 300 (represented as 300 in FIG. 2). Ultimately, RB2 may forward to RB3 the modified MPLS packet through Ethernet1.

Upon receiving the MPLS packet, RB3 may search the third unicast tunnel forwarding table shown in Table 15 for a unicast tunnel forwarding entry matching the unicast tunnel label L33 carried in the MPLS packet, in which in the identified unicast tunnel forwarding entry, an ingress label is L33 and an operation is pop. In addition, RB3 may pop up L33 carried in the MPLS packet and may decapsulate the MPLS packet to get the original unicast ethernet packet. Afterwards, RB3 may search the user MAC forwarding table for a MAC forwarding entry matching the inner D-MAC, i.e., S2, carried in the ethernet packet, in which an identified egress port in the MAC forwarding entry is Interface3. Ultimately, the ethernet packet may be sent to host S2 via Interface3.

As may be seen from the above description, the LSP label swapping and forwarding may be directly performed on the transit RB where the ethernet packet of the user is not exposed from the P2P LSP tunnel and the ethernet packet is exposed until the egress RB is reached.

In the examples of the present disclosure, the MPLS LSP tunnel in the TRILL network may not support the penultimate hop popping (PHP).

The above examples of the present disclosure describe a process of forwarding a unicast packet. Hereinafter, processes of forwarding a multicast packet, a broadcast packet, or an inner D-MAC unaware unicast packet are described in detail. Similarly, a P2MP LSP tunnel taking a DRB of a distribution tree as a root may be established through the signaling protocol similar to LDP or in a manner of static configuration, the specific process may be similar to the one in the above examples, and is not repeated herein.

Figure 1H:
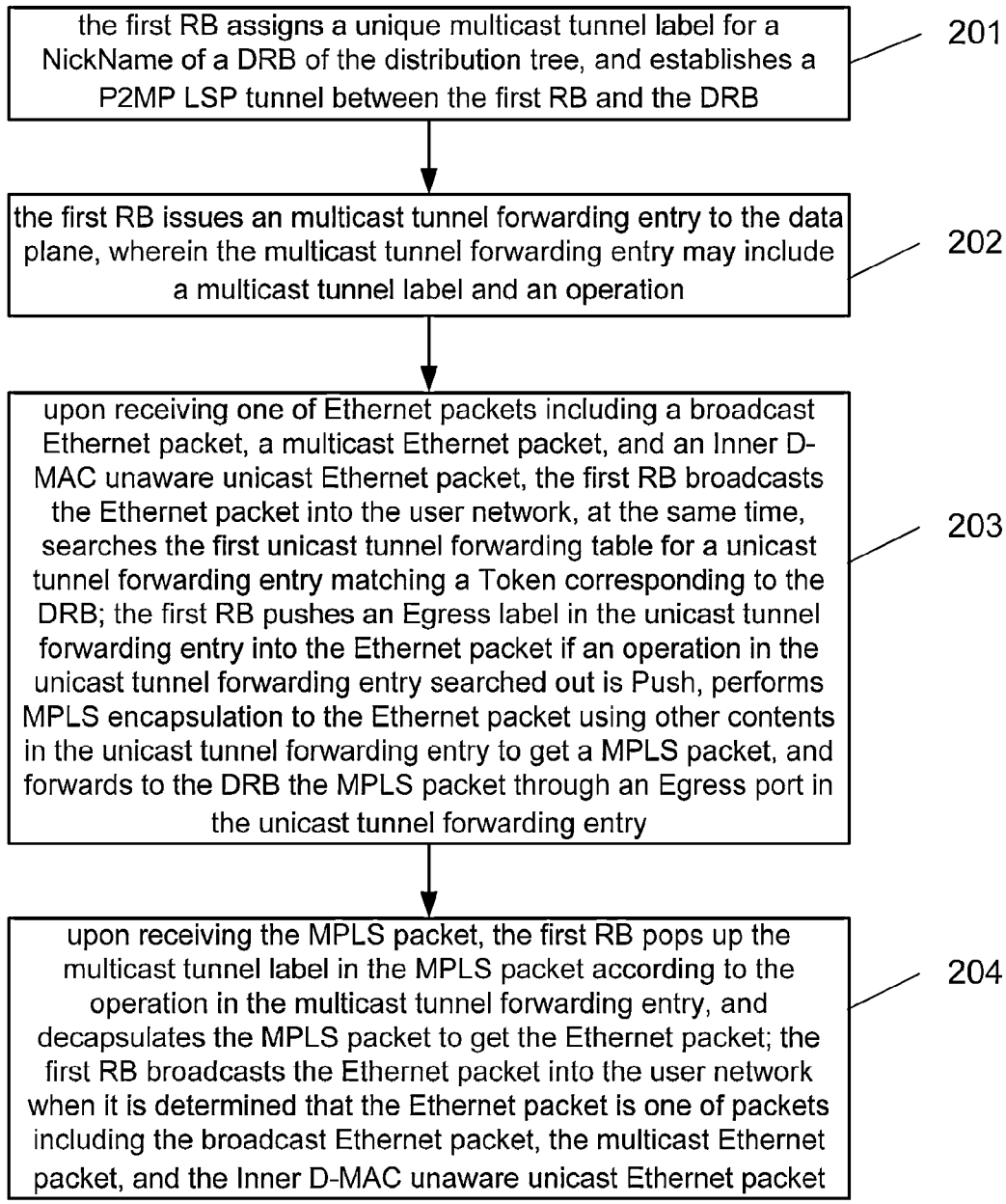
FIG. 1h is a flowchart illustrating a method for forwarding a packet in a TRILL network, according to an example of the present disclosure.

When the first RB is a leaf node of a distribution tree in the TRILL network, the method provided by an example of the present disclosure may further include the following operations, as shown in FIG. 1h. As shown in that figure, in block 201, the first RB may assign a unique multicast tunnel label for a NickName of a DRB of the distribution tree and may establish a P2MP LSP tunnel between the first RB and the DRB.

In block 202, the first RB may issue a multicast tunnel forwarding entry to the data plane, in which the multicast tunnel forwarding entry may include a multicast tunnel label and an operation. The multicast tunnel label may be the multicast tunnel label assigned by the first RB for the DRB and the operation may be pop.

In block 203, upon receiving one of ethernet packets including a broadcast ethernet packet, a multicast ethernet packet, and an inner D-MAC unaware unicast ethernet packet, the first RB may broadcast the ethernet packet into the user network, and at the same time, may search the first unicast tunnel forwarding table for a unicast tunnel forwarding entry matching a token corresponding to the DRB. In addition, the first RB may push an egress label in the unicast tunnel forwarding entry into the ethernet packet if an operation in the identified unicast tunnel forwarding entry is push, may perform MPLS encapsulation to the ethernet packet using other contents in the unicast tunnel forwarding entry to get a MPLS packet, and may forward to the DRB the MPLS packet through an egress port in the unicast tunnel forwarding entry.

Block 203 may be the same as the forwarding of a unicast packet discussed above.

In block 204, upon receiving the MPLS packet, the first RB may pop up the multicast tunnel label in the MPLS packet according to the operation in the multicast tunnel forwarding entry and may decapsulate the MPLS packet to get the ethernet packet. In addition, the first RB may broadcast the ethernet packet into the user network when it is determined that the ethernet packet is one of packets including the broadcast ethernet packet, the multicast ethernet packet, and the inner D-MAC unaware unicast ethernet packet.

Figure 1I:
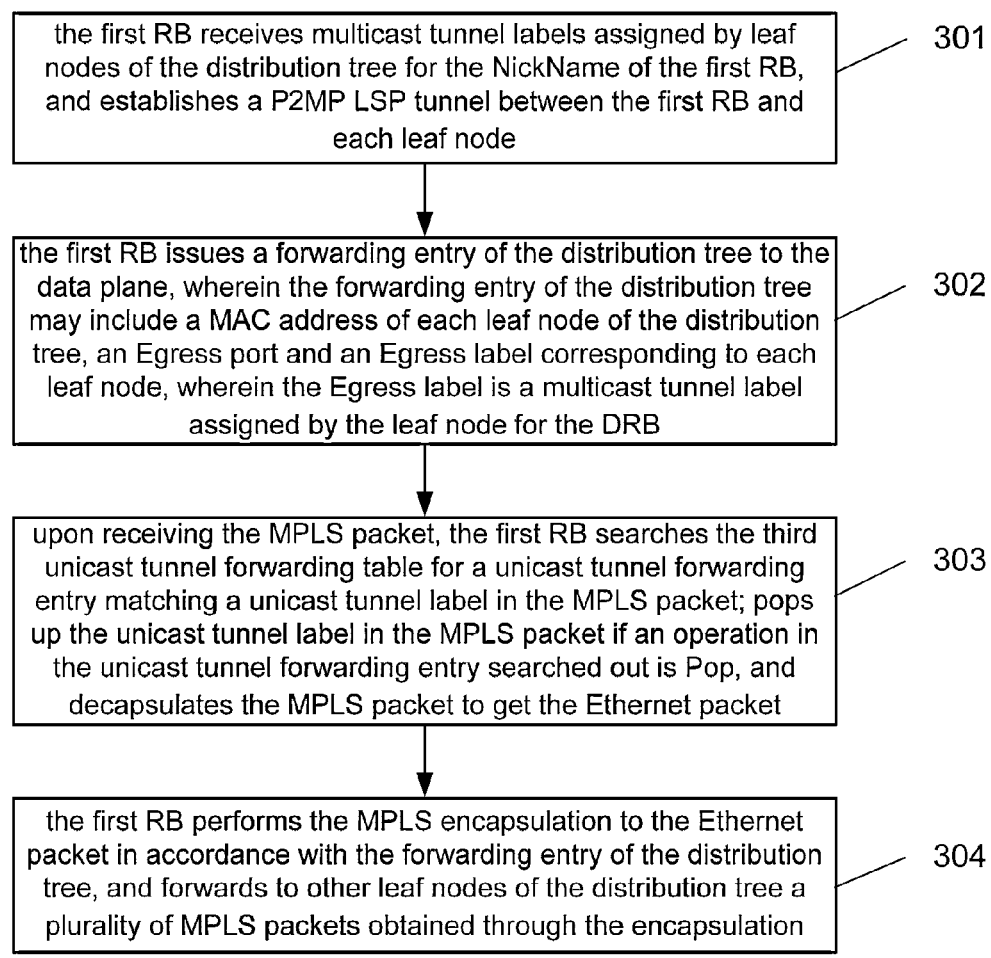
FIG. 1i is a flowchart illustrating a method for forwarding a packet in a TRILL network, according to an example of the present disclosure.

Furthermore, the method provided by an example of the present disclosure may further include operations as follows when the first RB is the DRB of the distribution tree, as shown in FIG. 1i. With reference to that figure, in block 301, the first RB may receive multicast tunnel labels assigned by leaf nodes of the distribution tree for the NickName of the first RB and may establish a P2MP LSP tunnel between the first RB and each leaf node.

In block 302, the first RB may issue a forwarding entry of the distribution tree to the data plane, in which the forwarding entry of the distribution tree may include a MAC address of each leaf node of the distribution tree, an egress port and an egress label corresponding to each leaf node, in which the egress label is a multicast tunnel label assigned by the leaf node for the DRB.

In block 303, upon receiving the MPLS packet, the first RB may search the third unicast tunnel forwarding table for a unicast tunnel forwarding entry matching a unicast tunnel label in the MPLS packet. The first RB may also pop up the unicast tunnel label in the MPLS packet if an operation in the identified unicast tunnel forwarding entry is pop and may decapsulate the MPLS packet to get the ethernet packet.

Block 303 may be the same as the forwarding of a unicast packet discussed above.

In block 304, the first RB may perform the MPLS encapsulation to the ethernet packet in accordance with the forwarding entry of the distribution tree and may forward to other leaf nodes of the distribution tree a plurality of MPLS packets obtained through the encapsulation.

By the above method, the multicast ethernet packet, the broadcast ethernet packet, and the inner D-MAC unaware unicast ethernet packet may be forwarded through the P2MP LSP tunnel.

As may be seen from the above description, when the multicast ethernet packet, the broadcast ethernet packet, or the inner D-MAC unaware unicast ethernet packet is forwarded, the packet may first be sent to the DRB through the P2P LSP tunnel, and then sent to other leaf nodes by the DRB through the P2MP LSP tunnel.

Figure 3:
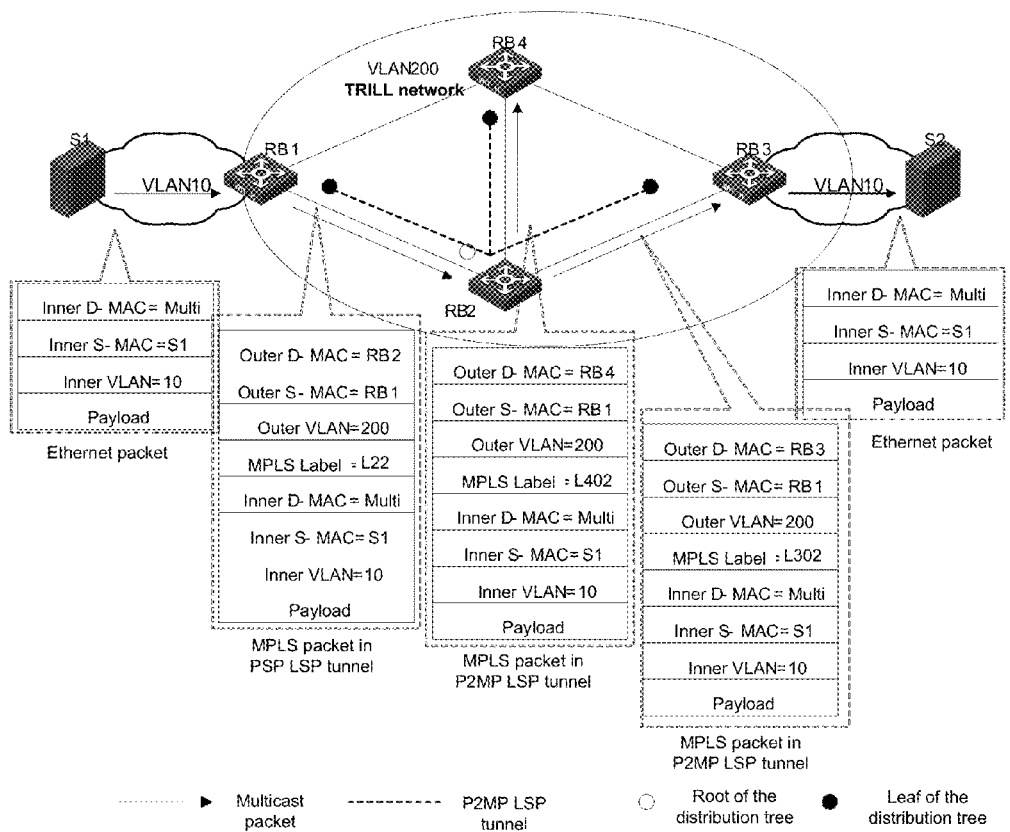
FIG. 3 is a schematic diagram illustrating forwarding a multicast packet in a TRILL network, according to an example of the present disclosure.

According to an example, the forwarding of the multicast packet is illustrated taking the TRILL network shown in FIG. 3 as an example. In FIG. 3, there is shown a distribution tree in the TRILL network, in which a root of the distribution tree, i.e., a DRB, is RB2, and other RBs such as RB1, RB3, and RB4 are leaf nodes of the distribution tree. Similarly, RB1, RB2, RB3, and RB4 may respectively assign, taking a NickName as a FEC, a unique multicast tunnel label for a NickName of RB2 which is taken as the DRB, and may establish a P2MP LSP tunnel between RB2. The multicast tunnel labels respectively assigned by RB1, RB3, and RB4 for RB2 may be L102, L302, and L402. RB1, RB3 and RB4 may respectively issue a multicast tunnel forwarding entry to the data plane after assigning the multicast tunnel label for RB2, as shown in Tables 16-18. As shown in those tables, the token assigned by RB1 for the NickName of RB2 is 1, and a first unicast tunnel forwarding table on RB1 may be as shown in Table 19. RB2 may issue the forwarding entry of the distribution tree to the data plane after receiving the multicast tunnel labels assigned by RB1, RB3, and RB4 for RB2, as shown in Table 20. In addition, a third unicast tunnel forwarding table on RB2 may be as shown in Table 21.

TABLE 16

The multicast tunnel forwarding entry on RB1

| multicast tunnel label | operation |
|---|---|
| L102 | Pop |

TABLE 17

The multicast tunnel forwarding entry on RB3

| multicast tunnel label | operation |
|---|---|
| L302 | Pop |

TABLE 18

The multicast tunnel forwarding entry on RB4

| multicast tunnel label | operation |
|---|---|
| L402 | Pop |

TABLE 19 a first unicast tunnel forwarding table on RB1

| Token | Egress label | Egress port | Outer VLAN | Next-hop MAC | operation |
|---|---|---|---|---|---|
| 1 | L22 | Ethernet0 | VLAN 200 | RB2 MAC | Push |
| ... | ... | ... | ... | ... | ... |

TABLE 20 the forwarding entry of the distribution tree on RB2

| Token | Next-hop MAC | Egress port | Egress label |
|---|---|---|---|
| A | RB1 MAC | Ethernet0 | L102 |
|   | RB3 MAC | Ethernet1 | L302 |
|   | RB4 MAC | Ethernet2 | L402 |

TABLE 21 a third unicast tunnel forwarding table on RB2

| Ingress label | operation |
|---|---|
| L22 | Pop |
| ... | ... |

Upon receiving an ethernet packet sent from Host S1, RB1 may determine, according to the inner D-MAC within the packet which is a multicast MAC address multi, that the ethernet packet is a multicast ethernet packet. RB1 may search the first unicast tunnel forwarding table shown in Table 19 for a unicast tunnel forwarding entry matching the token 1 corresponding to RB2 which is taken as the DRB. In the identified unicast tunnel forwarding entry, an egress label is L22, an egress port is Ethernet0, an outer VLAN is VLAN 200, a next-hop MAC is RB2 MAC, and an operation is push. RB1 may push L22 into the ethernet packet and may perform the MPLS encapsulation to the ethernet packet to obtain a MPLS packet. In this case, an outer D-MAC may be filled with RB2 MAC, an outer S-MAC may be filled with the MAC of RB1, and an outer VLAN may be filled with VLAN 200. The MPLS packet may be sent to RB2 via Ethernet0.

Upon receiving the MPLS packet, RB2 may search the third unicast tunnel forwarding table shown in Table 21 for a unicast tunnel forwarding entry matching a unicast tunnel label carried in the MPLS packet. In the identified unicast tunnel forwarding entry, an ingress label is L22 and an operation is pop. RB2 may pop up the unicast tunnel label L22 in the MPLS packet and may decapsulate the MPLS packet to get the ethernet packet. RB2 may perform the MPLS encapsulation to the ethernet packet in accordance with the forwarding entry of the distribution tree shown in Table 20 and may respectively forward to other leaf nodes of the distribution tree a plurality of MPLS packets obtained through the encapsulation.

Upon receiving the MPLS packet, RB3 (or RB4) may pop up a multicast tunnel label L302 (or L402) in the MPLS packet according to the operation pop in the multicast tunnel forwarding entry shown in Table 17 (or Table 18), and may decapsulate the MPLS packet to obtain the ethernet packet. When it is determined that the ethernet packet is the multicast ethernet packet, RB3 may broadcast the ethernet packet into the user network.

Figure 4A:
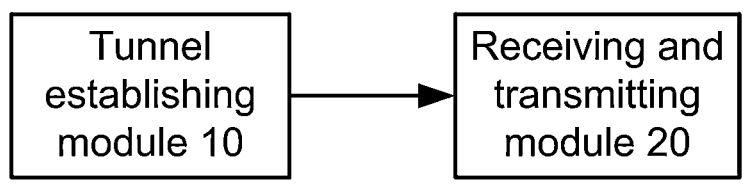
FIG. 4a is a schematic diagram illustrating a structure of a RB in a TRILL network, according to an example of the present disclosure.

For the method provided by the above examples, an example of the present disclosure further provides a RB in the TRILL network, which may employ the above method, as shown in FIG. 4a. As shown in FIG. 4a, the RB may include a tunnel establishing module 10 and a transmitting and receiving module 20. The tunnel establishing module 10 may assign, based on a NickName of each RB in a Nick-Name routing table at a control plane, a unicast tunnel label taking the NickName as a forwarding equivalence class (FEC), and may establish a point to point (P2P) label switched path (LSP) tunnel between the RB and other RBs in the TRILL network. The transmitting and receiving module 20 may receive and/or transmit a packet through the P2P LSP tunnel established by the tunnel establishing module 10.

Figure 4B:
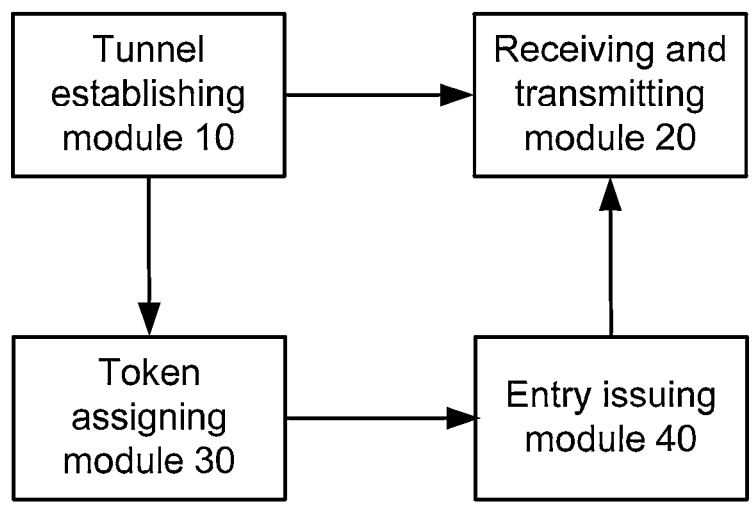
FIG. 4b is a schematic diagram illustrating a structure of a RB in a TRILL network, according to an example of the present disclosure.

When the RB is an ingress RB, as shown in FIG. 4b, the RB may further include a token assigning module 30 and an entry issuing module 40. The token assigning module 30 may assign, according to the NickName of each RB in the NickName routing table and taking the NickName as the FEC, a token for each NickName other than a NickName of the RB. The entry issuing module 40 may replace a NickName in each entry in the NickName routing table with an egress label, an operation, and a token corresponding to the NickName to establish a LFIB entry, and may issue the LFIB entry, which may be taken as a unicast tunnel forwarding entry of the NickName, to the first unicast tunnel forwarding table at a data plane without issuing the NickName routing table to the data plane. Each unicast tunnel forwarding entry in the first unicast tunnel forwarding table may include a token, an egress label, an egress port, an outer VLAN, a media access control (MAC) address of a next hop, and an operation. The egress label may be a unicast tunnel label assigned by the next hop for the NickName and the operation may be push. The push operation may be defined to mean to push a label. The entry issuing module 40 may further replace an egress RB NickName corresponding to a user MAC in a user MAC forwarding entry with a token corresponding to the egress RB NickName to obtain a new user MAC forwarding entry and may issue the new user MAC forwarding entry to the user MAC forwarding table at the data plane. Each MAC forwarding entry in the user MAC forwarding table may include an user MAC and a token.

Figure 4C:
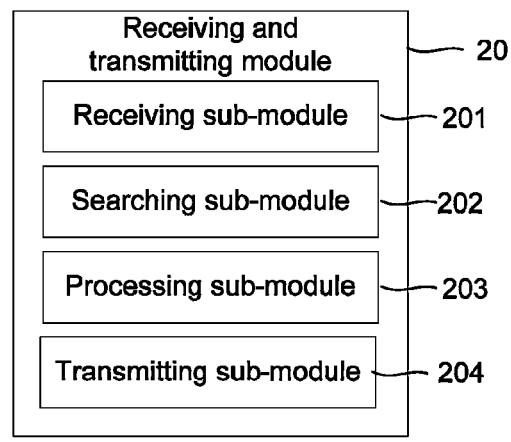
FIG. 4c is a schematic diagram illustrating a structure of a transmitting and receiving module of a RB in a TRILL network, according to an example of the present disclosure.

As shown in FIG. 4c, in an example of the present disclosure, the transmitting and receiving module 20 may further include a receiving sub-module 201, a searching sub-module 202, a processing sub-module 203, and a transmitting sub-module 204. The receiving sub-module 201 may receive a unicast ethernet packet sent from a user network. The searching sub-module 202 may search, upon the unicast ethernet packet being received by the receiving sub-module 201, the user MAC forwarding table for a MAC forwarding entry matching an inner destination-MAC (D-MAC) in the ethernet packet. The searching sub-module 202 may also search the first unicast tunnel forwarding table for a unicast tunnel forwarding entry matching a token in the identified MAC forwarding entry. The processing sub-module 203 may push, if an operation in the identified unicast tunnel forwarding entry is push, an egress label in the unicast tunnel forwarding entry into the ethernet packet. The processing sub-module 203 may also perform MPLS encapsulation to the ethernet packet using other content in the unicast tunnel forwarding entry to obtain a MPLS packet. The transmitting sub-module 204 may forward the MPLS packet obtained by the processing sub-module 203 to the next hop through an egress port in the unicast tunnel forwarding entry.

When the RB is a transit RB, the entry issuing module 40 may replace a NickName in each entry in the NickName routing table with an ingress label, an egress label, and an operation to establish a LFIB entry, and may issue the LFIB entry, which may be taken as a unicast tunnel forwarding entry of the NickName, to the second unicast tunnel forwarding table at the data plane without issuing the NickName routing table to the data plane. Each unicast tunnel forwarding entry in the second unicast tunnel forwarding table may include an ingress label, an egress label, an egress port, an outer VLAN, a MAC of a next hop, and an operation. The ingress label may be a unicast tunnel label assigned by the RB for the NickName, the egress label may be a unicast tunnel label assigned for the NickName by a next-hop RB which is in an entry corresponding to the NickName in the NickName routing table, and the operation may be swap, which may be defined to mean to swap a label. The receiving sub-module 201 may further receive a MPLS packet. The searching sub-module 202 may further search, after the receiving sub-module 201 receives the MPLS packet, the second unicast tunnel forwarding table for a unicast tunnel forwarding entry matching a unicast tunnel label in the MPLS packet. The processing sub-module 203 may further replace, if an operation in the unicast tunnel forwarding entry identified by the searching sub-module 202 is swap, the unicast tunnel label in the MPLS packet with an egress label in the unicast tunnel forwarding entry, replacing corresponding contents in the MPLS packet with other contents in the unicast tunnel forwarding entry. The transmitting sub-module 204 may forward the MPLS packet to the next hop through an egress port in the unicast tunnel forwarding entry.

When the RB is an egress RB, the entry issuing module 40 may replace the NickName in each entry in the NickName routing table with an ingress label and an operation to establish a LFIB entry, and may issue the LFIB entry, which may be taken as a unicast tunnel forwarding entry of the NickName, to the third unicast tunnel forwarding table at the data plane without issuing the NickName routing table to the data plane. Each unicast tunnel forwarding entry in the third unicast tunnel forwarding table may include an ingress label and an operation. The ingress label may be a unicast tunnel label assigned by the RB for the NickName and the operation may be pop, which may be defined to mean to pop up a label. The searching sub-module 202 may further search, after the receiving sub-module 201 receives a MPLS packet, the third unicast tunnel forwarding table for a unicast tunnel forwarding entry matching a unicast tunnel label in the MPLS packet. The processing sub-module 203 may further pop up the unicast tunnel label in the MPLS packet if an operation in the unicast tunnel forwarding entry identified by the searching sub-module 202 is pop, and may decapsulate the MPLS packet to obtain an ethernet packet. The transmitting sub-module 204 may further search the user MAC forwarding table for a MAC forwarding entry matching an inner D-MAC in the ethernet packet and may forward the ethernet packet through an egress port in the identified MAC forwarding entry.

During the processes of forwarding a multicast packet, a broadcast packet, or an inner D-MAC unaware unicast packet, the RB may be a DRB of a distribution tree, or may be a leaf node. When the RB is the leaf node of the distribution tree in the TRILL network, the modules in the RB may perform the following operations.

The tunnel establishing module 10 may assign a unique multicast tunnel label for a NickName of a designated RB (DRB) of a distribution tree in the TRILL network and may establish a point to multi-Point (P2MP) LSP tunnel between the first RB and the DRB. The entry issuing module 40 may issue the multicast tunnel forwarding entry to the data plane, in which the multicast tunnel forwarding entry may include a multicast tunnel label and an operation. The multicast tunnel label may be the multicast tunnel label assigned by the RB for the DRB and the operation may be pop. The receiving sub-module 201 may receive one of ethernet packets including a broadcast ethernet packet, a multicast ethernet packet, and an inner D-MAC unaware unicast ethernet packet. The searching sub-module 202 may search the first unicast tunnel forwarding table for a unicast tunnel forwarding entry matching a token corresponding to the DRB when the receiving sub-module 201 receives one of the ethernet packets including the broadcast ethernet packet, the multicast ethernet packet, and the inner D-MAC unaware unicast ethernet packet. The processing sub-module 203 may push an egress label in the identified unicast tunnel forwarding entry into the ethernet packet if an operation in the identified unicast tunnel forwarding entry by the searching sub-module 202 is push, may perform MPLS encapsulation to the ethernet packet using other contents in the unicast tunnel forwarding entry to obtain a MPLS packet, and may forward to the DRB the MPLS packet through an egress port in the unicast tunnel forwarding entry. The processing sub-module 203 may further pop up, upon receiving a MPLS packet, a multicast tunnel label in the MPLS packet according to the operation pop in the multicast tunnel forwarding entry, and may decapsulate the MPLS packet to obtain an ethernet packet. The transmitting sub-module 204 may broadcast the ethernet packet into the user network when the ethernet packet received by the receiving sub-module 201 or the ethernet packet obtained by the processing sub-module 201 through decapsulating is one of the ethernet packets including the broadcast ethernet packet, the multicast ethernet packet, and the inner D-MAC unaware unicast ethernet packet.

In addition, when the RB is the DRB of the distribution tree, the modules in the RB may perform function as follows. The tunnel establishing module 10 may receive a multicast tunnel label assigned by each leaf node of the distribution tree for the NickName of the RB and may establish a P2MP LSP tunnel between the RB and each leaf node. The entry issuing module 40 may issue the forwarding entry of the distribution tree to the data plane, in which the forwarding entry may include a MAC address of each leaf node of the distribution tree, an egress port, and an egress label corresponding to each leaf node. The egress label may be a multicast tunnel label assigned by each leaf node for the DRB. The processing sub-module 203 may search, after the receiving sub-module 201 receives a MPLS packet, the third unicast tunnel forwarding table for a unicast tunnel forwarding entry matching a unicast tunnel label in the MPLS packet. The processing sub-module 203 may also pop up the unicast tunnel label in the MPLS packet if an operation in the identified unicast tunnel forwarding entry is pop and may decapsulate the MPLS packet to obtain an ethernet packet. The processing sub-module 203 may further perform the MPLS encapsulation to the ethernet packet in accordance with the forwarding entry of the distribution tree to obtain a plurality of MPLS packets and may forward to leaf nodes of the distribution tree a plurality of MPLS packets.

The above-mentioned modules or sub-modules in the examples of the present disclosure may be deployed either in a centralized or a distributed configuration, and may be either merged into a single module, or further split into a plurality of sub-modules.

These modules may be implemented by software (e.g., machine readable instructions stored in a memory and executable by a processor), hardware (e.g., the processor of an Application Specific Integrated Circuit (ASIC)), or a combination thereof.

FIG. 5a is a schematic diagram illustrating a hardware structure of a RB in the TRILL network, according to an example of the present disclosure. As shown in FIG. 5a, the RB may include a first storage 501, a second storage 502, a processor 503, at least one port 504, and a bus 505. The first storage 501, the second storage 502, and the processor 503 are depicted as being interconnected via the bus 505. The RB may receive and transmit data through the port 504. In this case, the first storage 501 may store a NickName routing table, the second storage 502 may store machine readable instructions, and the processor 503 may execute the machine readable instructions to assign, based on a NickName of each RB in a NickName routing table at a control plane, a unicast tunnel label taking the NickName as a forwarding equivalence class (FEC) and establish a point to point (P2P) label switched path (LSP) tunnel between the RB and other RBs in the TRILL network. The processor 503 may also execute the machine readable instructions to receive and/or transmit a packet through the established P2P LSP tunnel.

The first storage 501 may further store a unicast tunnel forwarding table, and the processor 503 may further execute the machine readable instructions stored in the second storage 502 to assign, taking the NickName as the FEC, the unicast tunnel label for the FEC; establish, based on at least one of the unicast tunnel label assigned by the first RB for the NickName and a unicast tunnel label which is assigned for the NickName by a next-hop RB which is in an entry corresponding to the replaced NickName in a NickName routing table, a label forwarding information base (LFIB) entry of the FEC; and issue the LFIB entry to a data plane, wherein the LFIB entry is taken as a unicast tunnel forwarding entry of the NickName.

The first storage 501 may further store a first unicast tunnel forwarding table and a user MAC forwarding table. The processor 503 may further execute the machine readable instructions stored in the second storage 502 to assign, according to the NickName of each RB in the NickName routing table and taking the NickName as the FEC, a token for each NickName other than a NickName of the RB, replace a NickName in each entry in the NickName routing table with an egress label, an operation, and a token corresponding to the NickName to establish the LFIB entry, and may issue the LFIB entry, which may be taken as a unicast tunnel forwarding entry of the NickName, to the first unicast tunnel forwarding table at a data plane without issuing the NickName routing table to the data plane, in which each unicast tunnel forwarding entry in the first unicast tunnel forwarding table may include a token, an egress label, an egress port, an outer VLAN, a media access control (MAC) address of a next hop, and an operation, the egress label is a unicast tunnel label assigned by the next hop for the NickName, and the operation is push, which means to push a label. The processor 503 may further execute the machine readable instructions stored in the storage 502 to replace an egress RB NickName corresponding to a user MAC in a user MAC forwarding entry with a token corresponding to the egress RB NickName to obtain a new user MAC forwarding entry, and issue the new user MAC forwarding entry to the user MAC forwarding table at the data plane, in which each MAC forwarding entry in the user MAC forwarding table may include an inner MAC and a token. The processor 503 may further execute the machine readable instructions stored in the second storage 502 to receive a unicast ethernet packet sent from a user network, search, upon receiving the unicast ethernet packet, the user MAC forwarding table for a MAC forwarding entry matching an inner Destination-MAC (D-MAC) in the ethernet packet, search the first unicast tunnel forwarding table for a unicast tunnel forwarding entry matching a token in the identified MAC forwarding entry, and push, if an operation in the identified unicast tunnel forwarding entry is push, an egress label in the unicast tunnel forwarding entry into the ethernet packet, perform MPLS encapsulation to the ethernet packet using other contents in the unicast tunnel forwarding entry to obtain a MPLS packet, and forward the MPLS packet to the next hop through an Egress port in the unicast tunnel forwarding entry.

The first storage 501 may further store a second unicast tunnel forwarding table. The processor 503 may further execute the machine readable instructions stored in the second storage 502 to replace a NickName in each entry in the NickName routing table with an ingress label, an egress label, and an operation to establish the LFIB entry, and issue the LFIB entry, which may be taken as a unicast tunnel forwarding entry of the NickName, to the second unicast tunnel forwarding table at the data plane without issuing the NickName routing table to the data plane, in which each unicast tunnel forwarding entry in the second unicast tunnel forwarding table may include an ingress label, an egress label, an egress port, an outer VLAN, a MAC of a next hop, and an operation. The ingress label may be a unicast tunnel label assigned by the RB for the NickName, the egress label may be a unicast tunnel label assigned for the NickName by a next-hop RB which is in an entry corresponding to the NickName in the NickName routing table, and the operation may be swap, which may mean to swap a label. The processor 503 may further execute the machine readable instructions stored in the second storage 502 to receive a MPLS packet, search, upon receiving the MPLS packet, the second unicast tunnel forwarding table for a unicast tunnel forwarding entry matching a unicast tunnel label in the MPLS packet, and replace, if an operation in the identified unicast tunnel forwarding entry is swap, the unicast tunnel label in the MPLS packet with an egress label in the unicast tunnel forwarding entry, replace corresponding contents in the MPLS packet with other contents in the unicast tunnel forwarding entry, and forward the MPLS packet to the next hop through an egress port in the unicast tunnel forwarding entry.

The first storage 501 may further store a third unicast tunnel forwarding table. The processor 503 may further execute the machine readable instructions stored in the second storage 502 to replace the NickName in each entry in the NickName routing table with an ingress label and an operation to establish the LFIB entry and issue the LFIB entry, which may be taken as a unicast tunnel forwarding entry of the NickName, to the third unicast tunnel forwarding table at the data plane without issuing the NickName routing table to the data plane, in which each unicast tunnel forwarding entry in the third unicast tunnel forwarding table may include an ingress label and an operation. The ingress label may be a unicast tunnel label assigned by the RB for the NickName and the operation may be pop, which may mean to pop up a label. The processor 503 may further execute the machine readable instructions stored in the second storage 502 to search, upon receiving a MPLS packet, the third unicast tunnel forwarding table for a unicast tunnel forwarding entry matching a unicast tunnel label in the MPLS packet, pop up the unicast tunnel label in the MPLS packet if an operation in the identified unicast tunnel forwarding entry is pop, and decapsulate the MPLS packet to obtain an ethernet packet. The processor 503 may further execute the machine readable instructions stored in the second storage 502 to search the user MAC forwarding table for a MAC forwarding entry matching an inner D-MAC in the ethernet packet and forward the ethernet packet through an egress port in the identified MAC forwarding entry.

The first storage 501 may further store a multicast tunnel forwarding entry. The processor 503 may further execute the machine readable instructions stored in the second storage 502 to assign a unique multicast tunnel label for a NickName of a designated RB (DRB) of a distribution tree in the TRILL network and establish a point to multi-point (P2MP) LSP tunnel between the first RB and the DRB. The processor 503 may further execute the machine readable instructions stored in the second storage 502 to issue the multicast tunnel forwarding entry to the data plane, in which the multicast tunnel forwarding entry may include a multicast tunnel label and an operation, the multicast tunnel label may be the multicast tunnel label assigned by the RB for the DRB, and the operation may be pop. The processor 503 may further execute the machine readable instructions stored in the second storage 502 to receive one of ethernet packets including a broadcast ethernet packet, a multicast ethernet packet, and an inner D-MAC unaware unicast ethernet packet, broadcast, upon receiving one of the ethernet packets including the broadcast ethernet packet, the multicast ethernet packet, and the inner D-MAC unaware unicast ethernet packet, the ethernet packet into the user network, search the first unicast tunnel forwarding table for a unicast tunnel forwarding entry matching a token corresponding to the DRB at the same time, push an egress label in the identified unicast tunnel forwarding entry into the ethernet packet if an operation in the identified unicast tunnel forwarding entry is push, perform MPLS encapsulation to the ethernet packet using other content in the unicast tunnel forwarding entry to obtain a MPLS packet, and forward to the DRB the MPLS packet through an egress port in the unicast tunnel forwarding entry. The processor 503 may further execute the machine readable instructions stored in the second storage 502 to pop up, upon receiving a MPLS packet, a multicast tunnel label in the MPLS packet according to the operation pop in the multicast tunnel forwarding entry, decapsulate the MPLS packet to obtain an ethernet packet, and broadcast the ethernet packet into the user network when it is determined that the ethernet packet is one of the ethernet packets including the broadcast ethernet packet, the multicast ethernet packet, and the inner D-MAC unaware unicast ethernet packet.

The first storage 501 may further store a forwarding entry of the distribution tree. The processor 503 may further execute the machine readable instructions stored in the second storage 502 to receive a multicast tunnel label assigned by each leaf node of the distribution tree for the NickName of the RB and establish a P2MP LSP tunnel between the RB and each leaf node. The processor 503 may further execute the machine readable instructions stored in the second storage 502 to issue the forwarding entry of the distribution tree to the data plane, in which the forwarding entry may include a MAC address of each leaf node of the distribution tree, an egress port and an egress label corresponding to each leaf node, in which the egress label is a multicast tunnel label assigned by each leaf node for the DRB. The processor 503 may further execute the machine readable instructions stored in the second storage 502 to search, upon receiving a MPLS packet, the third unicast tunnel forwarding table for a unicast tunnel forwarding entry matching a unicast tunnel label in the MPLS packet, pop up the unicast tunnel label in the MPLS packet if an operation in the identified unicast tunnel forwarding entry is pop, decapsulate the MPLS packet to obtain an ethernet packet, perform the MPLS encapsulation to the ethernet packet in accordance with the forwarding entry of the distribution tree to obtain a plurality of MPLS packets, and forward to leaf nodes of the distribution tree a plurality of MPLS packets.

Figure 5B:
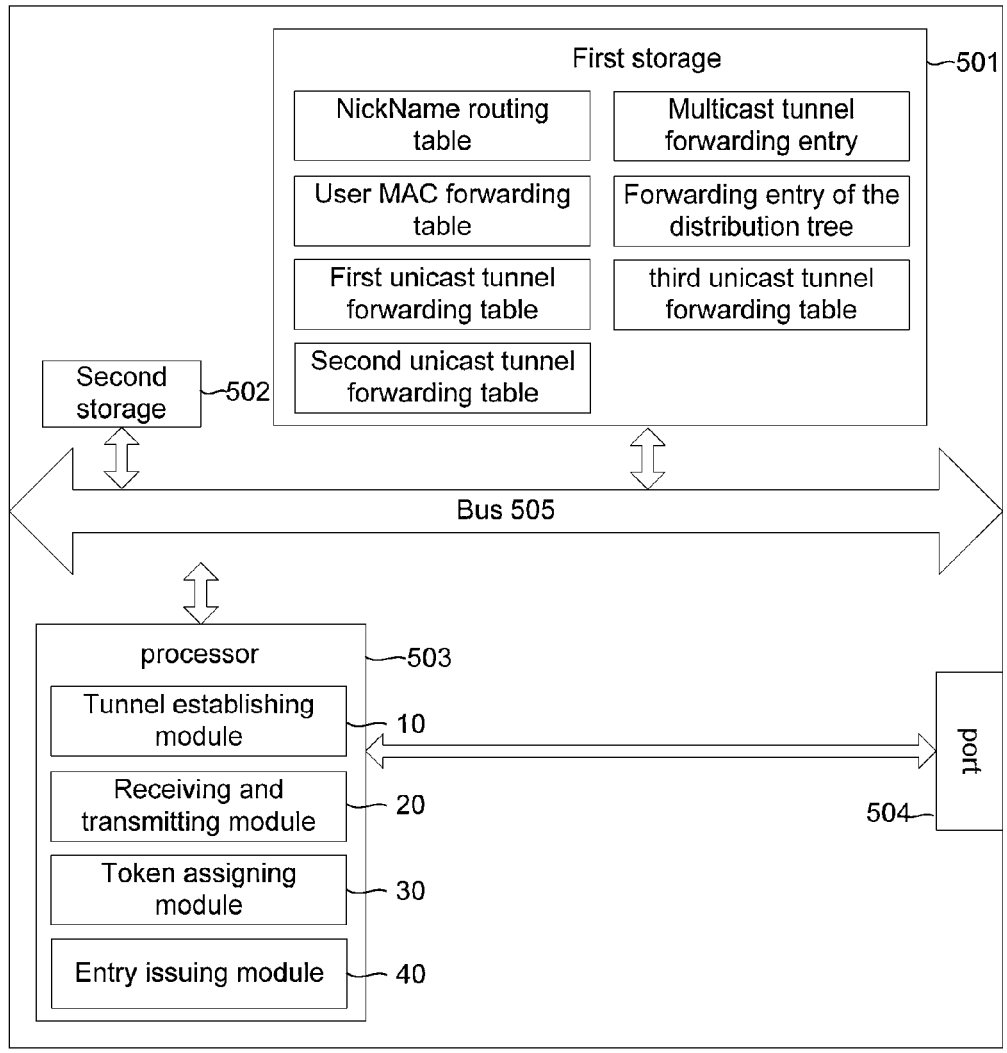
FIG. 5b is a schematic diagram illustrating a hardware structure of a RB in a TRILL network, according to an example of the present disclosure.

As may be seen from the above description, when the machine readable instructions stored in the second storage 502 are executed by the processor 503, functions of the foregoing tunnel establishing module 10, the receiving and transmitting module 20, the token assigning module 30, and the entry issuing module 40 may be achieved, as shown in FIG. 5b.

In view of the above, examples of the present disclosure may enable establishment of a MPLS LSP tunnel between the RBs in a TRILL network, and thus, a packet may be forwarded using the MPLS LSP tunnel instead of NickName forwarding. In one regard, therefore, a hardware forwarding chip may simply support the MPLS LSP tunnel forwarding and may not need to support NickName forwarding. One consequence of which is that the hardware forwarding chip may not need to be upgraded when the network is upgraded, thus reducing the economic costs and the difficulties of network deployment. In addition, a packet may be forwarded through the MPLS LSP tunnel, and thus, the hardware forwarding chip may not need to be upgraded when the TRILL network is deployed due to the widespread use of the MPLS LSP forwarding. Furthermore, functions of the NickName forwarding such as carrying TTL (Time To Time, i.e., the survival time) parameters and load balancing may still be achieved when the packet is forwarded through the MPLS LSP tunnel, therefore, the original functions of the TRILL network may not be affected in the examples of the present disclosure.

The above examples may be implemented by hardware, software or firmware, or a combination thereof. For example, the various methods, processes and functional modules described herein may be implemented by a processor (the term processor is to be interpreted broadly to include a CPU, processing unit, ASIC, logic unit, or programmable gate array, etc.). The processes, methods, and functional modules disclosed herein may all be performed by a single processor or split between several processors. In addition, reference in this disclosure or the claims to a 'processor' should thus be interpreted to mean 'one or more processors'. The processes, methods and functional modules disclosed herein may be implemented as machine readable instructions executable by one or more processors, hardware logic circuitry of the one or more processors or a combination thereof. Further the examples disclosed herein may be implemented in the form of a computer software product. The computer software product may be stored in a non-transitory storage medium and may include a plurality of instructions for making a computer apparatus (which may be a personal computer, a server or a network apparatus such as a router, switch, access point, etc.) implement the method recited in the examples of the present disclosure.

Those skilled in the art may understand that all or part of the procedures of the methods of the above examples may be implemented by hardware modules following machine readable instructions. The machine readable instructions may be stored in a computer readable storage medium. When running, the machine readable instructions may provide the procedures of the method examples. The storage medium may be diskette, CD, ROM (Read-Only Memory) or RAM (Random Access Memory), and etc.

The figures are only illustrations of examples, in which the modules or procedures shown in the figures may not be necessarily essential for implementing the present disclosure. The modules in the aforesaid examples may be combined into one module or further divided into a plurality of sub-modules.

The above are several examples of the present disclosure, and are not used for limiting the protection scope of the present disclosure. Any modifications, equivalents, improvements, etc., made under the principle of the present disclosure should be included in the protection scope of the present disclosure.

What has been described and illustrated herein is an example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

What is claimed is:

1. A method for forwarding a packet in a network, wherein the network comprises a plurality of routing bridges (RBs), the method comprising:
   assigning, by a first RB, based on a NickName of each RB in a NickName routing table at a control plane, a unicast tunnel label taking the NickName as a forwarding equivalence class (FEC);
   establishing, by the first RB, a point to point (P2P) label switched path (LSP) tunnel between the first RB and other RBs in the network; and
   at least one of receiving and transmitting, by the first RB, a packet through the established P2P LSP tunnel.

2. The method of claim 1, wherein the operation of establishing the P2P LSP tunnel comprises:
   assigning, by the first RB taking the NickName as the FEC, the unicast tunnel label for the FEC;
   establishing, by the first RB, based on at least one of the unicast tunnel label assigned by the first RB for the NickName and a unicast tunnel label which is assigned for the NickName by a next-hop RB which is in an entry corresponding to the replaced NickName in a NickName routing table, a label forwarding information base (LFIB) entry of the FEC; and
   issuing, by the first RB, the LFIB entry to a data plane, wherein the LFIB entry is taken as a unicast tunnel forwarding entry of the NickName.

3. The method of claim 2, wherein the first RB is an ingress RB, the method further comprising:
   assigning, by the first RB, a token for each NickName other than a NickName of the first RB, and recording the token in a unicast tunnel forwarding entry associated with the each NickName at the data plane;
   replacing, by the first RB, an egress RB NickName corresponding to a user MAC in a user MAC forwarding entry with a token corresponding to the egress RB NickName to obtain a new user MAC forwarding entry; and
   issuing, by the first RB, the new user MAC forwarding entry to a user MAC forwarding table at the data plane;
   wherein the at least one of receiving and transmitting, by the first RB, a packet through the established P2P LSP tunnel further comprises:
   searching, by the first RB, upon receiving a unicast ethernet packet sent from a user network, the user MAC forwarding table for a MAC forwarding entry matching an inner Destination-MAC (D-MAC) in the ethernet packet;
   searching, by the first RB, the unicast tunnel forwarding table for a unicast tunnel forwarding entry matching a token in the identified MAC forwarding entry;
   performing, by the first RB, based on the identified unicast tunnel forwarding entry, MPLS encapsulation to the ethernet packet to obtain a MPLS packet; and
   forwarding the MPLS packet to the next-hop RB through an egress port in the identified unicast tunnel forwarding entry.

4. The method of claim 2, wherein the first RB is a transit RB, the at least one of receiving and transmitting, by the first RB, a packet through the established P2P LSP tunnel further comprises:

searching, by the first RB, upon receiving a MPLS packet, the unicast tunnel forwarding table for a unicast tunnel forwarding entry matching a unicast tunnel label in the MPLS packet;

replacing, by the first RB, based on the identified unicast tunnel forwarding entry, the unicast tunnel label in the MPLS packet with an egress label in the identified unicast tunnel forwarding entry;

replacing, by the first RB, corresponding content in the MPLS packet with other content in the identified unicast tunnel forwarding entry; and forwarding the MPLS packet to the next-hop RB through an egress port in the identified unicast tunnel forwarding entry.

5. The method of claim 2, wherein the first RB is an egress RB, the at least one of receiving and transmitting, by the first RB, a packet through the established P2P LSP tunnel further comprises:

searching, by the first RB upon receiving a MPLS packet, the unicast tunnel forwarding table for a unicast tunnel forwarding entry matching a unicast tunnel label in the MPLS packet;

popping up, by the first RB, the unicast tunnel label in the MPLS packet according to the identified unicast tunnel forwarding entry;

decapsulating the MPLS packet to obtain an ethernet packet;

searching, by the first RB, the user MAC forwarding table for a MAC forwarding entry matching an inner D-MAC in the ethernet packet; and forwarding the ethernet packet through an egress port in the identified MAC forwarding entry.

6. The method of claim 5, wherein the first RB is a leaf node of a distribution tree in the network, the method further comprising:

assigning, by the first RB, a unique multicast tunnel label for a NickName of a designated RB (DRB) of the distribution tree;

establishing, by the first RB, a point to multi-point (P2MP) LSP tunnel between the first RB and the DRB;

issuing, by the first RB, a multicast tunnel forwarding entry to the data plane, wherein the multicast tunnel forwarding entry comprises a multicast tunnel label and an operation, wherein the multicast tunnel label is the multicast tunnel label assigned by the first RB for the DRB and the operation is a pop operation;

broadcasting, by the first RB upon receiving one of a plurality of ethernet packets including a broadcast ethernet packet, a multicast ethernet packet, and an inner D-MAC unaware unicast ethernet packet, the one of the plurality of ethernet packets into the user network;

searching the unicast tunnel forwarding table for a unicast tunnel forwarding entry matching a token corresponding to the DRB, pushing an egress label in the identified unicast tunnel forwarding entry into the ethernet packet in response to an operation in the identified unicast tunnel forwarding entry being a push operation;

performing, by the first RB, MPLS encapsulation to the ethernet packet using other content in the identified unicast tunnel forwarding entry to obtain a first MPLS packet;

forwarding, to the DRB, the first MPLS packet through an egress port in the identified unicast tunnel forwarding entry; and popping up, by the first RB upon receiving a second MPLS packet, a multicast tunnel label in the second MPLS packet according to the pop operation in the multicast tunnel forwarding entry;

decapsulating the second MPLS packet to obtain an ethernet packet;

broadcasting the ethernet packet into the user network when it is determined that the ethernet packet is one of the broadcast ethernet packet, the multicast ethernet packet, and the inner D-MAC unaware unicast ethernet packet.

7. The method of claim 5, wherein the first RB is the DRB of the distribution tree, the method further comprising:

receiving, by the first RB, a multicast tunnel label assigned by each leaf node of the distribution tree for the NickName of the first RB;

establishing, by the first RB, a P2MP LSP tunnel between the first RB and each leaf node;

issuing, by the first RB, a forwarding entry of the distribution tree to the data plane, wherein the forwarding entry comprises a MAC address of each leaf node of the distribution tree, an egress port and an egress label corresponding to each leaf node, and wherein the egress label is a multicast tunnel label assigned by each leaf node for the DRB;

searching, by the first RB upon receiving a MPLS packet, the unicast tunnel forwarding table for a unicast tunnel forwarding entry matching a unicast tunnel label in the MPLS packet;

popping up the unicast tunnel label in the MPLS packet in response to a determination that an operation in the identified unicast tunnel forwarding entry is a pop operation;

decapsulating the MPLS packet to obtain an ethernet packet;

performing, by the first RB, the MPLS encapsulation to the ethernet packet in accordance with the forwarding entry of the distribution tree to obtain a plurality of MPLS packets; and forwarding the plurality of MPLS packets to leaf nodes of the distribution tree.

8. The method of claim 1, wherein the network comprises a transparent interconnection of lots of links (TRILL) network.

9. A routing bridge (RB) in a network, the RB comprising:
a first storage to store a NickName routing table;
a second non-transitory storage to store machine readable instructions; and
a processor, to execute the machine readable instructions to:
assign, based on a NickName of each RB in a NickName routing table at a control plane, a unicast tunnel label taking the NickName as a forwarding equivalence class (FEC);
establish a point to point (P2P) label switched path (LSP) tunnel between the RB and other RBs in the network; and
at least one of receive and transmit a packet through the established P2P LSP tunnel.

10. The RB of claim 9, wherein the first storage is further to store a unicast tunnel forwarding table and wherein the processor is further to execute the machine readable instructions stored in the second storage to:
assign, taking the NickName as the FEC, the unicast tunnel label for the FEC;
establish, based on at least one of the unicast tunnel label assigned by the first RB for the NickName and a unicast tunnel label which is assigned for the NickName by a next-hop RB which is in an entry corresponding to the replaced NickName in a NickName routing table, a label forwarding information base (LFIB) entry of the FEC; and issue the LFIB entry to a data plane, wherein the LFIB entry is taken as a unicast tunnel forwarding entry of the NickName.

11. The RB of claim 10, wherein the first storage is further to store a user MAC forwarding table and wherein the processor is further to execute the machine readable instructions stored in the second storage to:

assign a token for each NickName other than a NickName of the RB, and record the token in a unicast tunnel forwarding entry associated with the each NickName at the data plane;

replace an egress RB NickName corresponding to a user MAC in a user MAC forwarding entry with a token corresponding to the egress RB NickName to obtain a new user MAC forwarding entry;

issue the new user MAC forwarding entry to the user MAC forwarding table at the data plane;

wherein the processor is further to execute the machine readable instructions stored in the second storage to:

receive a unicast ethernet packet sent from a user network;

search, upon receiving the unicast ethernet packet, the user MAC forwarding table for a MAC forwarding entry matching an inner Destination-MAC (D-MAC) in the ethernet packet;

search the unicast tunnel forwarding table for a unicast tunnel forwarding entry matching a token in the identified MAC forwarding entry;

perform, based on the identified unicast tunnel forwarding entry, MPLS encapsulation to the ethernet packet to obtain a MPLS packet; and forward the MPLS packet to the next-hop RB through an egress port in the identified unicast tunnel forwarding entry.

12. The RB of claim 10, wherein the processor is further to execute the machine readable instructions stored in the second storage to:

receive a MPLS packet;

search, upon receiving the MPLS packet, the unicast tunnel forwarding table for a unicast tunnel forwarding entry matching a unicast tunnel label in the MPLS packet;

replace, based on the identified unicast tunnel forwarding entry, the unicast tunnel label in the MPLS packet with an egress label in the identified unicast tunnel forwarding entry;

replace corresponding content in the MPLS packet with other content in the identified unicast tunnel forwarding entry; and forward the MPLS packet to the next-hop RB through an egress port in the identified unicast tunnel forwarding entry.

13. The RB of claim 10, wherein the processor is further to execute the machine readable instructions stored in the second storage to:

search, upon receiving a MPLS packet, the unicast tunnel forwarding table for a unicast tunnel forwarding entry matching a unicast tunnel label in the MPLS packet;

pop up the unicast tunnel label in the MPLS packet according to the identified unicast tunnel forwarding entry;

decapsulate the MPLS packet to obtain an ethernet packet;

search the user MAC forwarding table for a MAC forwarding entry matching an inner D-MAC in the ethernet packet; and forward the ethernet packet through an egress port in the identified MAC forwarding entry.

14. The RB of claim 13, wherein the first storage is further to store a multicast tunnel forwarding entry and wherein the processor is further to execute the machine readable instructions stored in the second storage to:

assign a unique multicast tunnel label for a NickName of a Designated RB (DRB) of a distribution tree in the network;

establish a point to multi-point (P2MP) LSP tunnel between the first RB and the DRB;

issue the multicast tunnel forwarding entry to the data plane, wherein the multicast tunnel forwarding entry comprises a multicast tunnel label and an operation and wherein the multicast tunnel label is the multicast tunnel label assigned by the RB for the DRB, and the operation is a pop operation;

receive one of a plurality of ethernet packets including a broadcast ethernet packet, a multicast ethernet packet, and an Inner D-MAC unaware unicast ethernet packet;

broadcast, upon receiving the one of the plurality of ethernet packets, the one of the plurality of ethernet packets into the user network;

search the unicast tunnel forwarding table for a unicast tunnel forwarding entry matching a token corresponding to the DRB, pushing an egress label in the identified unicast tunnel forwarding entry into the ethernet packet in response to an operation in the identified unicast tunnel forwarding entry being a push operation;

perform MPLS encapsulation to the ethernet packet using other content in the identified unicast tunnel forwarding entry to obtain a first MPLS packet; and forward, to the DRB, the first MPLS packet through an egress port in the identified unicast tunnel forwarding entry;

pop up, upon receiving a second MPLS packet, a multicast tunnel label in the second MPLS packet according to the pop operation in the multicast tunnel forwarding entry;

decapsulate the second MPLS packet to obtain an ethernet packet;

broadcast the ethernet packet into the user network when it is determined that the ethernet packet is one of a plurality of ethernet packets including the broadcast ethernet packet, the multicast ethernet packet, and the inner D-MAC unaware unicast ethernet packet.

15. The RB of claim 13, wherein the first storage is further to store a forwarding entry of the distribution tree and wherein the processor is further to execute the machine readable instructions stored in the second storage to:

receive a multicast tunnel label assigned by each leaf node of the distribution tree for the NickName of the RB;

establish a P2MP LSP tunnel between the RB and each leaf node;

issue the forwarding entry of the distribution tree to the data plane, wherein the forwarding entry comprises a MAC address of each leaf node of the distribution tree, an egress port, and an egress label corresponding to each leaf node, and wherein the egress label is a multicast tunnel label assigned by each leaf node for the DRB;

search, upon receiving a MPLS packet, the unicast tunnel forwarding table for a unicast tunnel forwarding entry matching a unicast tunnel label in the MPLS packet;

pop up the unicast tunnel label in the MPLS packet in response to a determination that an operation in the identified unicast tunnel forwarding entry is a pop operation;
decapsulate the MPLS packet to obtain an ethernet packet;
perform the MPLS encapsulation to the ethernet packet in accordance with the forwarding entry of the distribution tree to obtain a plurality of MPLS packets; and
forward the plurality of MPLS packets to leaf nodes of the distribution tree.

\* \* \* \* \*